US010479288B2

(12) United States Patent
Nelson et al.

(10) Patent No.: US 10,479,288 B2
(45) Date of Patent: Nov. 19, 2019

(54) RELEASABLE VEHICULAR CAMERA MOUNT

(71) Applicant: MotoCrane, LLC, Prior Lake, MN (US)

(72) Inventors: Zachary C. Nelson, Prior Lake, MN (US); Scott A. Tovsen, Prior Lake, MN (US); Daniel Price, Reno, NV (US); Joseph Cox, Berkeley, CA (US); Justin Squire, Minneapolis, MN (US); Yann Talhouarne, Minneapolis, MN (US)

(73) Assignee: MotoCrane, LLC, Minneapolis, MN (US)

( * ) Notice: Subject to any disclaimer, the term of this patent is extended or adjusted under 35 U.S.C. 154(b) by 230 days.

(21) Appl. No.: 15/669,628

(22) Filed: Aug. 4, 2017

(65) Prior Publication Data

US 2018/0037172 A1    Feb. 8, 2018

Related U.S. Application Data

(60) Provisional application No. 62/488,660, filed on Apr. 21, 2017, provisional application No. 62/371,573, filed on Aug. 5, 2016.

(51) Int. Cl.
*B60R 11/04* (2006.01)
*G03B 17/56* (2006.01)
*B60R 11/00* (2006.01)

(52) U.S. Cl.
CPC ............ *B60R 11/04* (2013.01); *G03B 17/561* (2013.01); *B60R 2011/004* (2013.01);
(Continued)

(58) Field of Classification Search
CPC ............... B60R 11/04; B60R 2011/004; B60R 2011/0056; B60R 2011/0084;
(Continued)

(56) References Cited

U.S. PATENT DOCUMENTS 2,055,014 A    9/1936 Manger
2,668,682 A    2/1954 Dalton
(Continued)

FOREIGN PATENT DOCUMENTS

EP    1604244 B1    12/2005
EP    1887274 A1    2/2008
(Continued)

OTHER PUBLICATIONS

Chase Car Inc., [online], 2017 [retrieved on Jun. 18, 2014] Retrieved from the Internet: <URL: www.chasecarinc.com>.
(Continued)

*Primary Examiner* — Christopher Garft
(74) *Attorney, Agent, or Firm* — Craige Thompson; Thompson Patent Law

(57) ABSTRACT

Apparatus and associated methods relate to a camera mount system (CMS) releasably mountable to vehicle surfaces via a plurality of leg members, each leg member extending radially from a hub to support an articulating wrist member with a distal suction attachment. In an illustrative example, the articulating wrist may adjust vertically to permit secure sealing of the suction attachment to a local vehicle roof surface. Each of the articulating wrists may couple to a corresponding distal end of one of the leg members via, for example, a ball joint. The wrist angle relative to the leg member may be releasably locked by hand operation of a locking control that, for example, also locks the angle of the wrist relative to the suction attachment. Some systems may advantageously be quickly, releasably and securely mounted from non-planar and/or irregularly shaped vehicle surfaces, for example, roofs, roll cages, hulls, doors, hoods, and bodies.

11 Claims, 21 Drawing Sheets

(52) U.S. Cl.
CPC ............... *B60R 2011/0056* (2013.01); *B60R 2011/0084* (2013.01); *B60R 2011/0085* (2013.01); *B60R 2011/0092* (2013.01)

(58) Field of Classification Search
CPC ..... B60R 2011/0085; B60R 2011/0092; B60R 11/0211; B60R 2011/0042; G03B 17/561; G03B 29/00; G03B 17/56; G03B 17/568; F16M 11/08; F16M 11/12; F16M 11/2014
USPC .... 248/663, 481, 482, 181.1, 181.2, 288.31, 248/288.51, 206.2, 349.1; 396/419, 428
See application file for complete search history.

(56) References Cited

U.S. PATENT DOCUMENTS

| | | | |
|---|---|---|---|
| 3,411,322 A | | 11/1968 | Abels |
| 3,480,310 A | | 11/1969 | McElwain |
| 4,357,089 A | | 11/1982 | Okura et al. |
| 4,402,626 A | | 9/1983 | Recker |
| 4,431,334 A | | 2/1984 | Cleveland et al. |
| 4,615,597 A | | 10/1986 | Burriss |
| 5,419,522 A | * | 5/1995 | Luecke ............... F16C 11/106 248/288.51 |
| 5,508,852 A | | 4/1996 | Bednarsky et al. |
| 5,835,808 A | | 11/1998 | Parker et al. |
| 6,475,058 B2 | | 11/2002 | Mammano et al. |
| 6,776,488 B2 | | 8/2004 | Burbulla |
| 6,820,980 B1 | | 11/2004 | Romanoff et al. |
| 6,963,694 B2 | | 11/2005 | Nomura |
| 6,994,436 B2 | | 2/2006 | Harris |
| 7,066,739 B2 | | 6/2006 | McLeish |
| 7,079,762 B2 | | 7/2006 | Nomura |
| 7,101,045 B2 | | 9/2006 | Romanoff et al. |
| 7,128,419 B2 | | 10/2006 | Harris |
| 7,217,045 B2 | | 5/2007 | Jones |
| 7,527,439 B1 | | 5/2009 | Dumm |
| 8,419,468 B2 | | 4/2013 | Alrutz et al. |
| 8,534,951 B2 | * | 9/2013 | Komine ............... F16C 11/106 248/288.51 |
| 8,573,546 B2 | | 11/2013 | Valles Navarro et al. |
| 2005/0007553 A1 | | 1/2005 | Romanoff et al. |
| 2006/0147196 A1 | | 7/2006 | Hein et al. |
| 2008/0034954 A1 | | 2/2008 | Grober |
| 2008/0312770 A1 | | 12/2008 | Alvarez et al. |
| 2011/0255854 A1 | | 10/2011 | Chapman |
| 2012/0019702 A1 | | 1/2012 | Richter |
| 2012/0269504 A1 | | 10/2012 | Chapman |
| 2013/0071102 A1 | | 3/2013 | Imafuji et al. |
| 2015/0248048 A1 | * | 9/2015 | Jung ................... G03B 17/561 396/428 |
| 2016/0170289 A1 | | 6/2016 | Matt |

FOREIGN PATENT DOCUMENTS

| | | |
|---|---|---|
| EP | 2665249 A1 | 11/2013 |
| WO | WO-1998/044287 A1 | 8/1998 |
| WO | WO-2003/046431 A1 | 6/2003 |

OTHER PUBLICATIONS

Pursuit Systems Inc., [online], Crane-brochure, 2012 [retrieved on Jun. 22, 2014] Retrieved from the Internet: <http://pursuitsystems.com/gear/crane/crane-brochure.pdf>.

Pursuit Systems Inc., [online], Crane-specs, 2012 [retrieved on Jun. 22, 2014] Retrieved from the Internet: <http://pursuitsystems.com/gear/crane/crane-specs.pdf>.

Pursuit Systems Inc., [online], Cayenne-brochure, 2012 [retrieved on Jun. 22, 2014] Retrieved from the Internet: <http://pursuitsystems.com/gear/cayenne/cayenne-brochure.pdf>.

International Search Report in related International Application No. PCT/US17/45623; dated Oct. 24, 2017, 3 pages.

Written Opinion of the International Searching Authority in related International Application No. PCT/US17/45623; dated Oct. 24, 2017, 7 pages.

"Sucker Pod Sucker Pod x42"; Kayalu, Apr. 2016, [online], [retrieved on Nov. 15, 2017]. Retrieved from the Internet <https://web.archive.org/web/20160411121538/https://www.kayalu.com/k/suckerpod-suction-cup-tripod-kayak-camera-mount-vacuum-cup-ram-mounts-components.php>.

International Preliminary Report on Patentability in related International Application No. PCT/US2017/045623; dated Feb. 14, 2019, 8 pages.

* cited by examiner

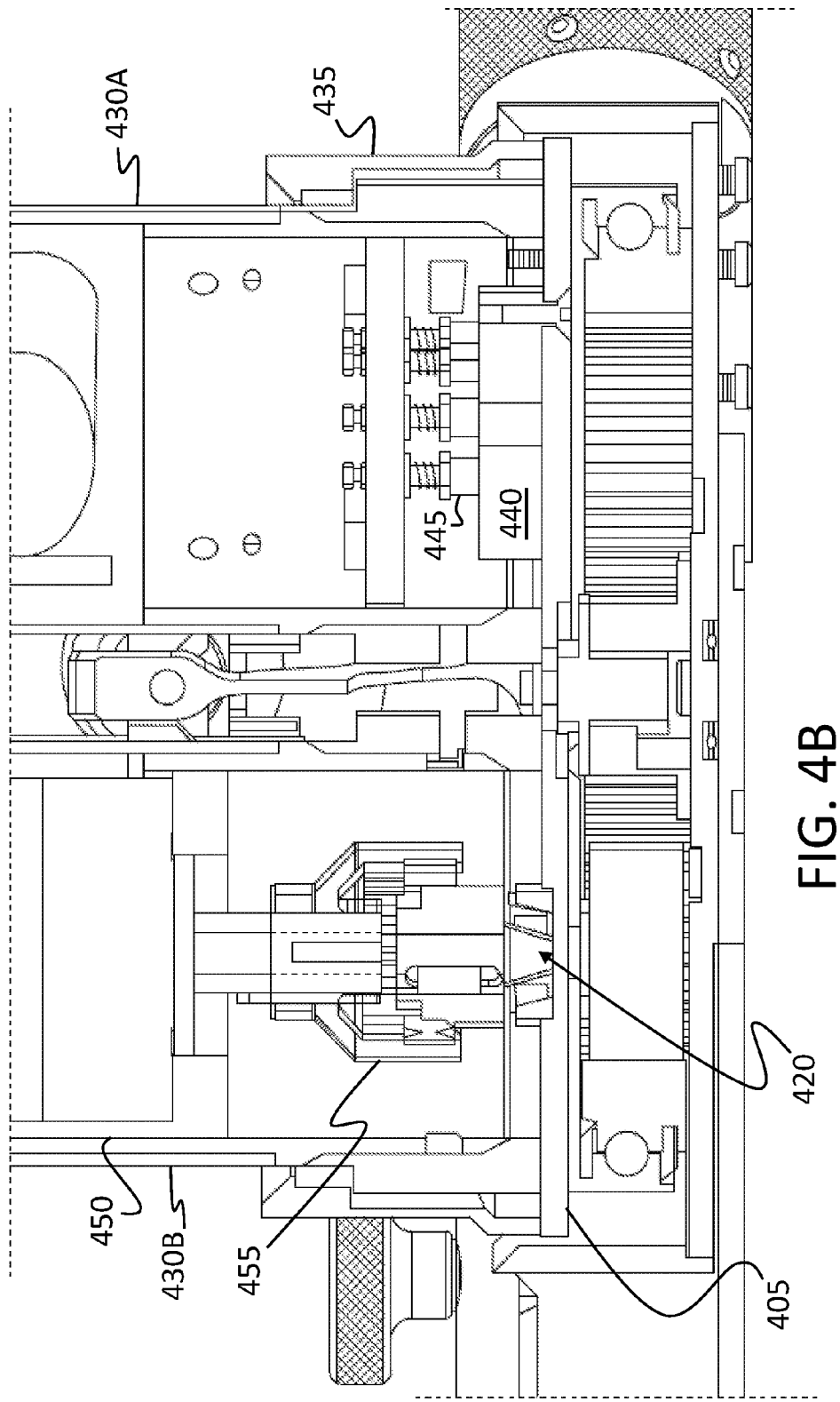

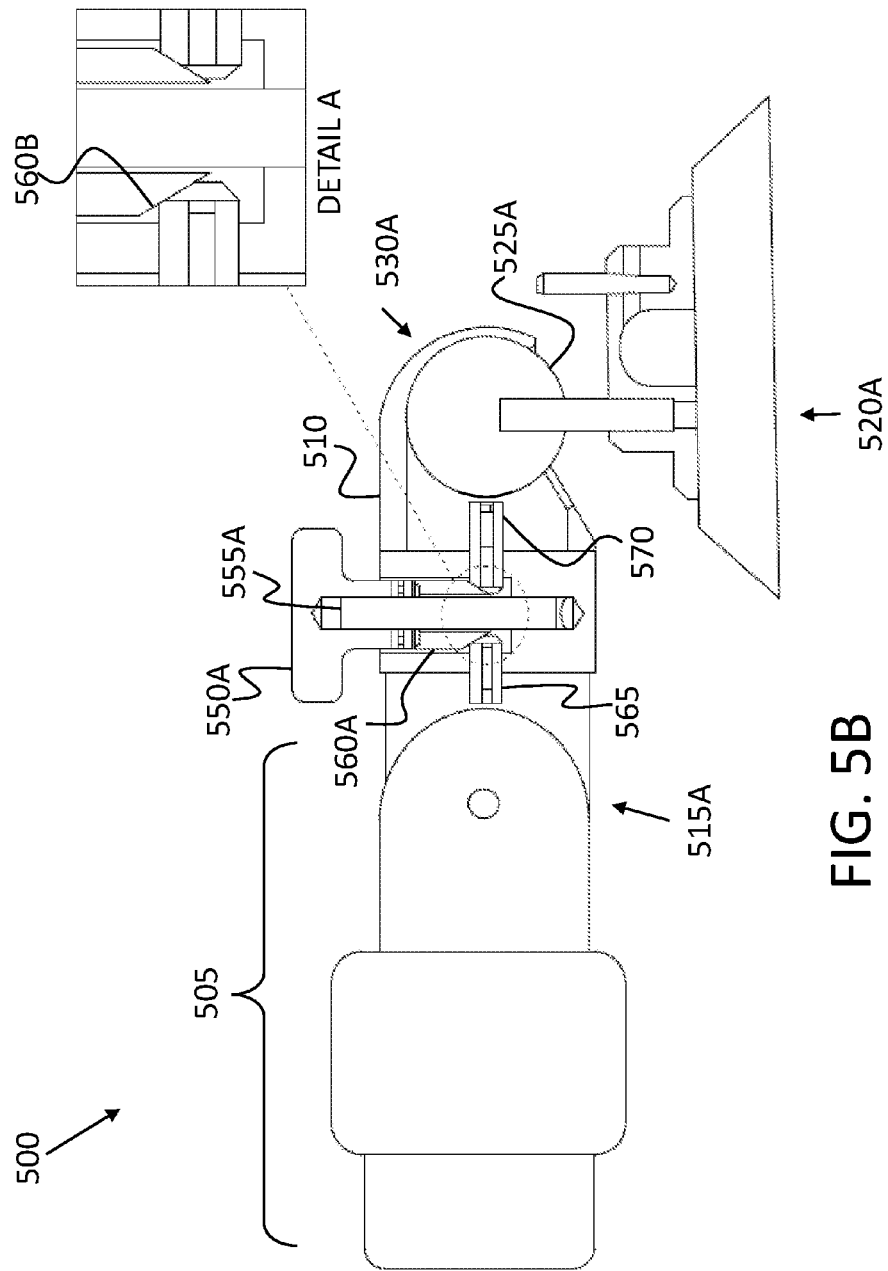

RELEASABLE VEHICULAR CAMERA MOUNT

CROSS-REFERENCE TO RELATED APPLICATIONS

This application claims the benefit of U.S. Provisional Application Ser. No. 62/488,660 titled "MotoCrane Gen3 Update," filed by Zachary C. Nelson et al., on Apr. 21, 2017, and also claims the benefit of U.S. Provisional Application Ser. No. 62/371,573 titled "Vehicular Camera Mount," filed by Zachary C. Nelson et al., on Aug. 5, 2016.

This application incorporates the entire contents of the foregoing application(s) herein by reference.

TECHNICAL FIELD

Various embodiments relate generally to mobile camera rigs.

BACKGROUND

A camera allows a user to capture an image oriented in the camera's field of view. Different optic lenses may permit the user to adjust the camera's field of view, such as, for example, modifying a focal length may magnify the image the user intends to capture. The adjustments to the field of view may allow a user to capture, at various perspectives, still shots, for example, of the image.

Cameras may capture different types of images. For example, a movie camera may capture a moving image. The movie camera may record the captured moving image on a film. A video camera may also capture a moving image. The video camera may record the captured moving image in a variety of media. For example, some video cameras use video cassettes to store the captured image. Some video cameras compress the captured image to store as a digital image via optical disc, hard drives, or flash memory, for example.

Platforms for cameras can allow a user to reposition a camera so as to change the camera's field of view. A tripod with a swivel top, for example, allows a user to rotate the camera to a different field of views. A user may mount a camera on a rail to reposition the camera while capturing images from different fields of view.

SUMMARY

Apparatus and associated methods relate to a camera mount system (CMS) releasably mountable to vehicle surfaces via a plurality of leg members, each leg member extending radially from a hub to support an articulating wrist member with a distal suction attachment. In an illustrative example, the articulating wrist may adjust vertically to permit secure sealing of the suction attachment to a local vehicle roof surface. Each of the articulating wrists may couple to a corresponding distal end of one of the leg members via, for example, a ball joint. The wrist angle relative to the leg member may be releasably locked by hand operation of a locking control that, for example, also locks the angle of the wrist relative to the suction attachment. Some systems may advantageously be quickly, releasably and securely mounted from non-planar and/or irregularly shaped vehicle surfaces, for example, roofs, roll cages, hulls, doors, hoods, and bodies.

Apparatus and associated methods relate to a 3-axis motorized gimbal camera mount including a plurality of motors, the motors passing electrical power through a rotating joint, each joint defining a camera axis configured for unlimited rotations. In an illustrative example, each joint of the camera mount may include two members: a reference member and a rotating member. A slip ring may be fixedly coupled to the perimeter of the rotating member. A brush may be coupled to each reference member in a tensioned relationship, the brush pressing against the slip ring. The slip ring and the brush are electrically conductive and may pass electrical current between one another when rotating or still. Each joint may include one or more slip ring and brush pairs, advantageously creating one or more electrical circuits. In various examples, the rotating joints with power pass-through may advantageously provide photographers with 360° of camera motion in all 3 axes with unlimited rotations.

Various embodiments may achieve one or more advantages. For example, some embodiments may permit camera crews with limited budgets to professionally film chase-car scenes. In some examples, camera crews may conveniently travel by air, reasonably transporting the CMS equipment on a plane, allowing the crew to be more flexible with their schedules. In addition, camera crews may employ rental vehicles to deploy the CMS, since the CMS requires no vehicle modifications. Some embodiments of the CMS may adjust to a range of vehicular rooftops, hoods or other irregular and/or non-planar surfaces.

In some examples, the CMS system may be a fully automated and remotely operated camera crane that may turn virtually any vehicle into a compatible camera vehicle without permanent modifications to any CMS system components, nor any modifications to the vehicle. In some examples, the CMS may be a revolutionary system for the camera industry, providing a low-cost alternative to larger, heavier, more complicated, permanently-installed mobile camera booms.

The details of various embodiments are set forth in the accompanying drawings and the description below. Other features and advantages will be apparent from the description and drawings, and from the claims.

BRIEF DESCRIPTION OF THE DRAWINGS

FIG. 4B depicts a cross-sectional elevation view of a drive mechanism and quick disconnect tower of a base subsystem of an exemplary PB-CMS.

FIG. 5B depicts a cross-sectional elevation view of a support ankle of a base subsystem of an exemplary PB-CMS.

Like reference symbols in the various drawings indicate like elements.

DETAILED DESCRIPTION OF ILLUSTRATIVE EMBODIMENTS

To aid understanding, this document is organized as follows. First, a portable boom and camera mounting system (PB-CMS) in a disassembly scenario is briefly introduced with reference to FIGS. 1A, 1B, 1C, 1D and 1E. Second, with reference to FIG. 2 an exemplary PB-CMS is presented. Next, with reference to FIGS. 3A, 3B, 3C, 4A, 4B, 5A, 5B, 5C, 5D, 5E, 6A, 6B, 7 and 8, the discussion turns to exemplary embodiments that illustrate exemplary PB-CMS subsystems. Finally, with reference to FIG. 9, an electrical system block diagram for an exemplary PB-CMS is presented.

Figure 1A:
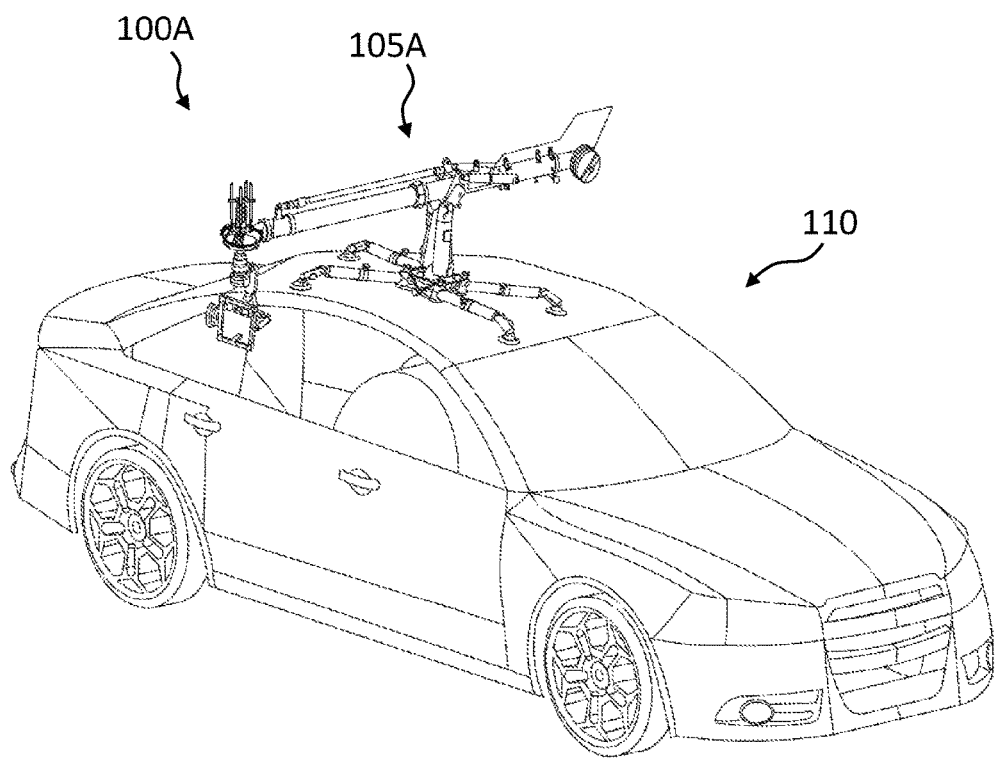
FIG. 1A depicts a perspective view of a fully assembled and installed portable boom and camera mounting system (PB-CMS).

FIG. 1A depicts a perspective view of a fully assembled and installed portable boom and camera mounting system (PB-CMS). The PB-CMS may be installed on any type of vehicle (e.g., land, water, air) and may be broken down and/or collapsed into easily transportable groups. A deployed PB-CMS system in a use case scenario 100A includes a PB-CMS 105A installed on a vehicle 110.

Figure 1B:
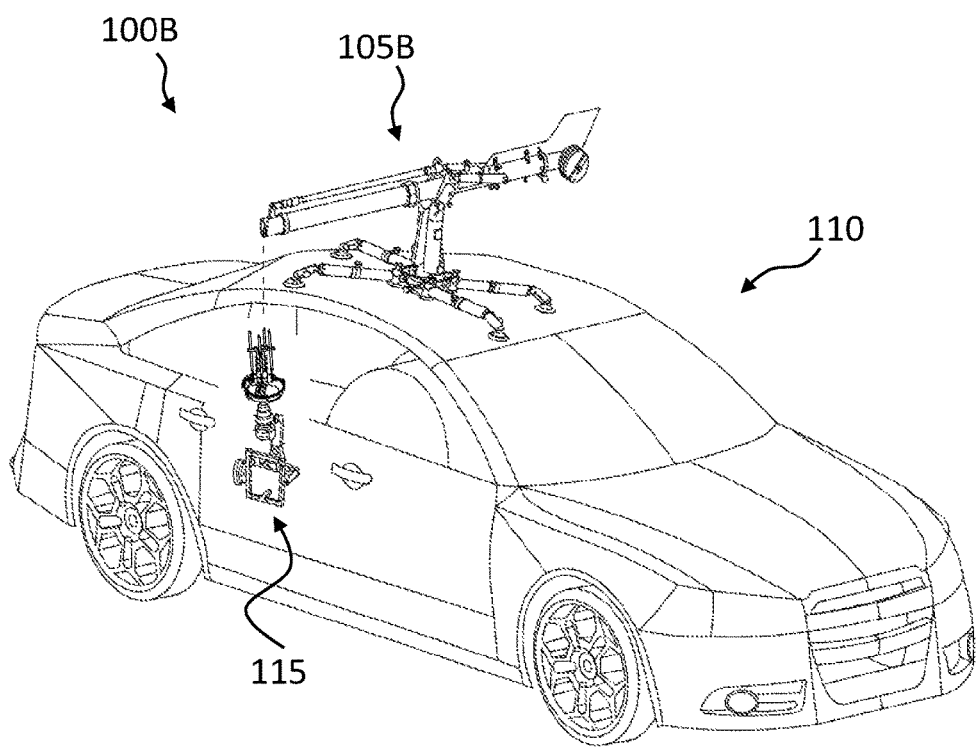
FIG. 1B depicts a perspective view of a partially disassembled PB-CMS.

FIG. 1B depicts a perspective view of a partially disassembled PB-CMS. A first disassembly scenario 100B includes a PB-CMS 105B and the vehicle 110. The PB-CMS 105B includes a head 115. In the first disassembly scenario 100B, the head 115 is released to prepare it for stowage. In some examples, a camera mount subsystem may be coupled to the head 115. In such examples, the camera mount subsystem may be removed from the head 115, before the head 115 is removed from the PB-CMS 105B.

Figure 1C:
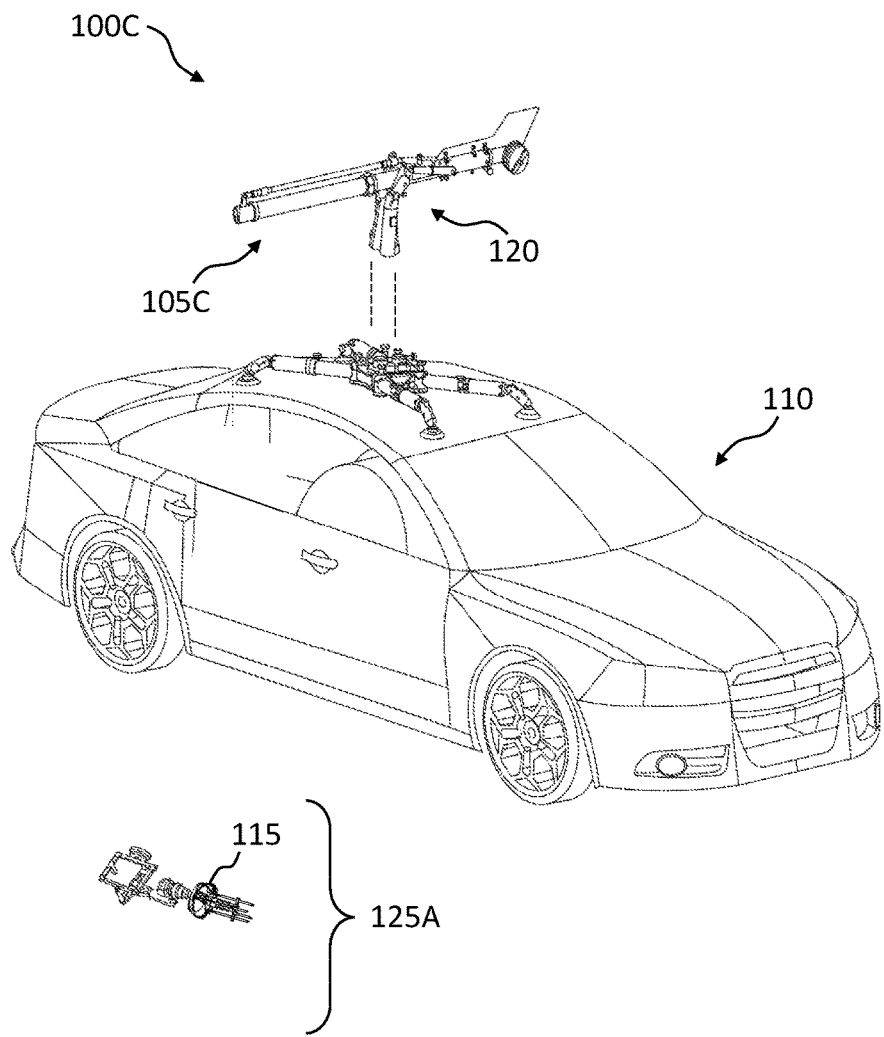
FIG. 1C depicts a perspective view of a partially disassembled PB-CMS.

FIG. 1C depicts a perspective view of a partially disassembled PB-CMS. A second disassembly scenario 100C includes a partial PB-CMS 105C and the vehicle 110. The partial PB-CMS 105C includes a boom 120. In the second disassembly scenario 100C, the boom 120 is released to prepare it for stowage. A staged pile 125A includes the head 115.

Figure 1D:
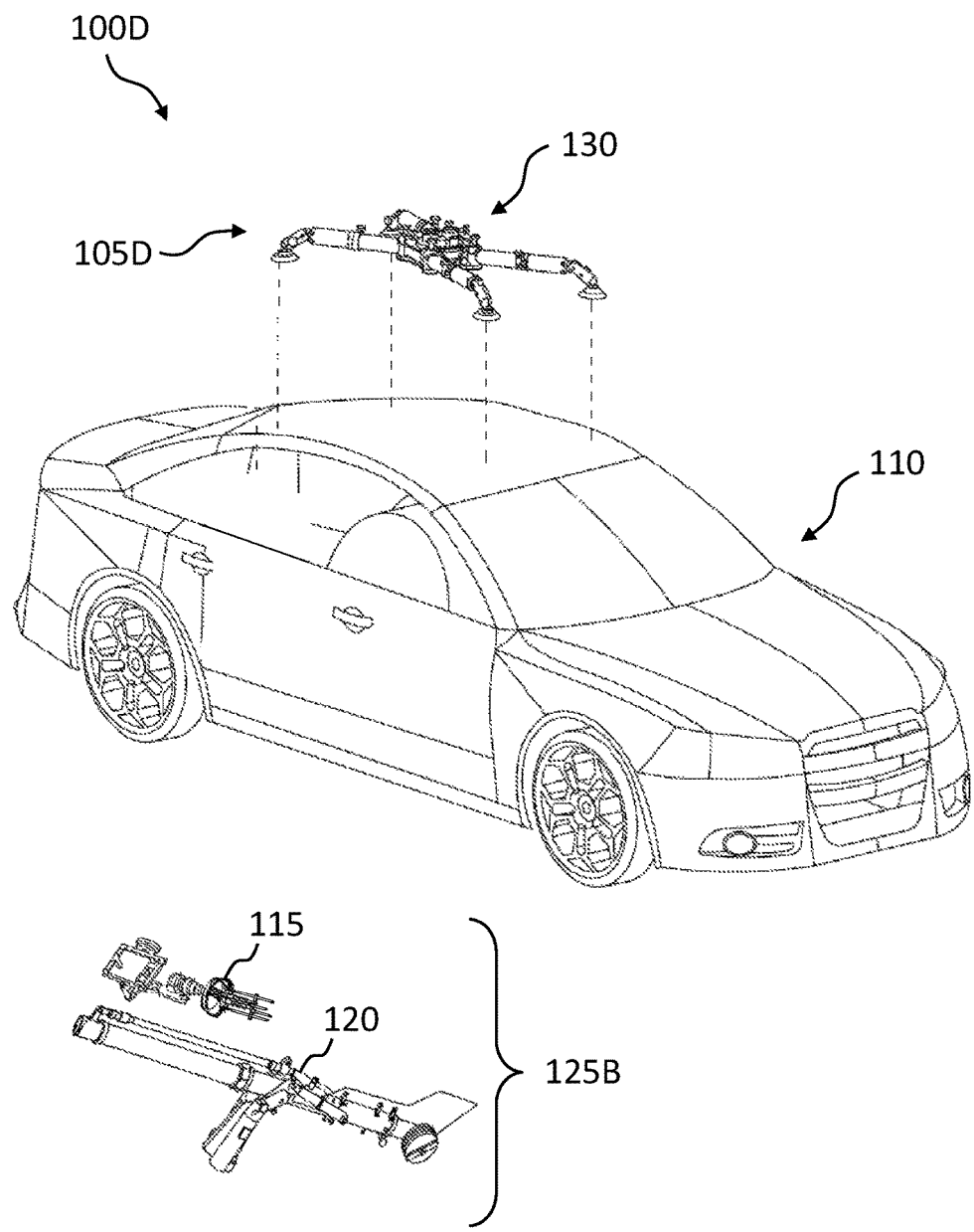
FIG. 1D depicts a perspective view of a partially disassembled PB-CMS.

FIG. 1D depicts a perspective view of a partially disassembled PB-CMS. A third disassembly scenario 100D includes a partial PB-CMS 105D and the vehicle 110. The partial PB-CMS 105D includes a base 130. In the third disassembly scenario 100D, the base 130 is released to prepare it for stowage. A staged pile 125B includes the head 115 and the boom 120.

Figure 1E:
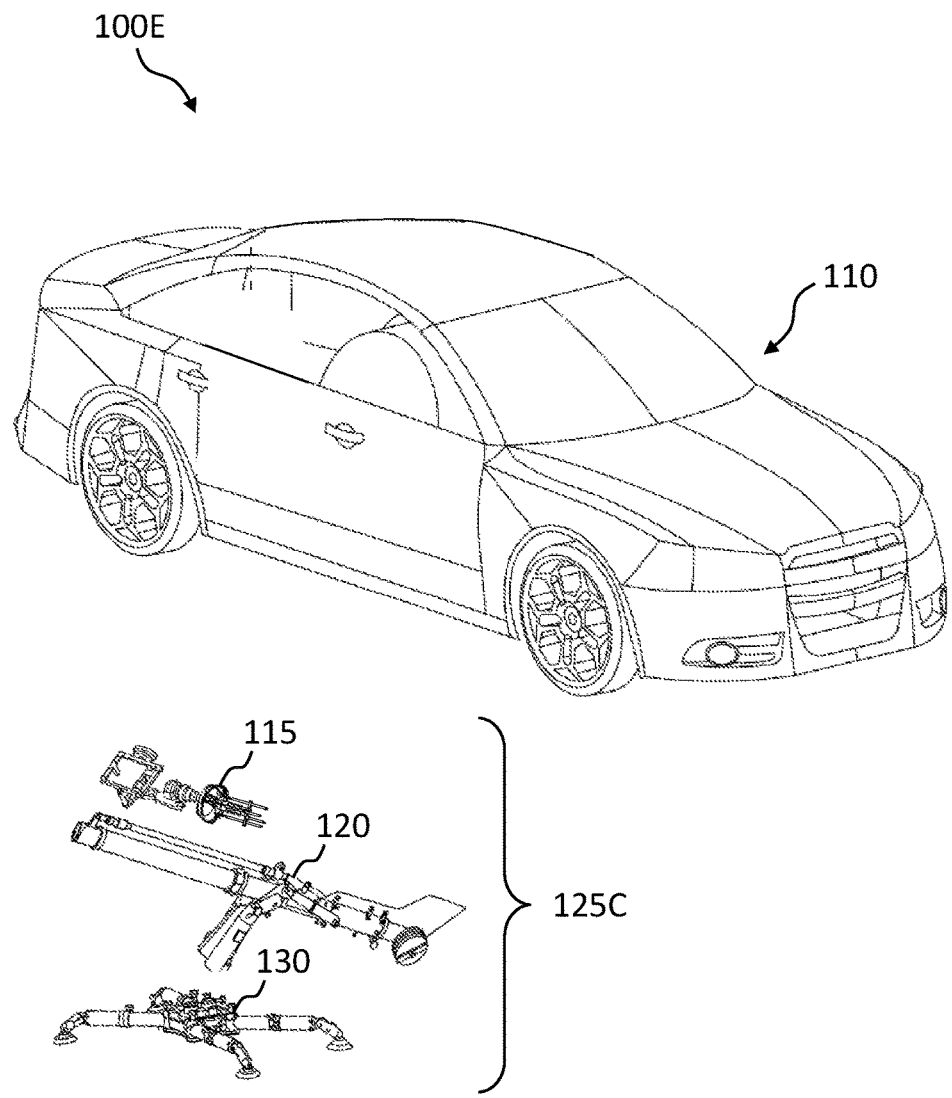
FIG. 1E depicts a perspective view of a fully disassembled PB-CMS.

FIG. 1E depicts a perspective view of a fully disassembled PB-CMS. A fourth disassembly scenario 100E includes the vehicle 110. A staged pile 125C includes the head 115, the boom 120 and the base 130.

As described in FIGS. 1A-1E, the unique disassembly feature of the PB-CMS 105A may define it as temporary in nature. Users of the PB-CMS 105A may advantageously employ any vehicle to utilize the features of the PB-CMS 105A. Accordingly, users may quickly move the PB-CMS 105A from one vehicle to the next, for example, in situations where certain vehicles may be better adapted to the terrain of a given movie scene.

In an illustrative example, camera crews traveling from movie-set to movie-set may advantageously travel by air, transporting a PB-CMS as luggage, and deploying the PB-CMS on a rental vehicle upon arriving at their destination. Small camera crews, for example, a one-man-operation may benefit in the modularity of the PB-CMS. In some examples, the PB-CMS may be configured for a single-person assembly and disassembly. Since the PB-CMS may be broken down and collapsed, small camera crews, even single-person crews, may advantageously manage the PB-CMS into conveniently transportable groups.

Figure 2:
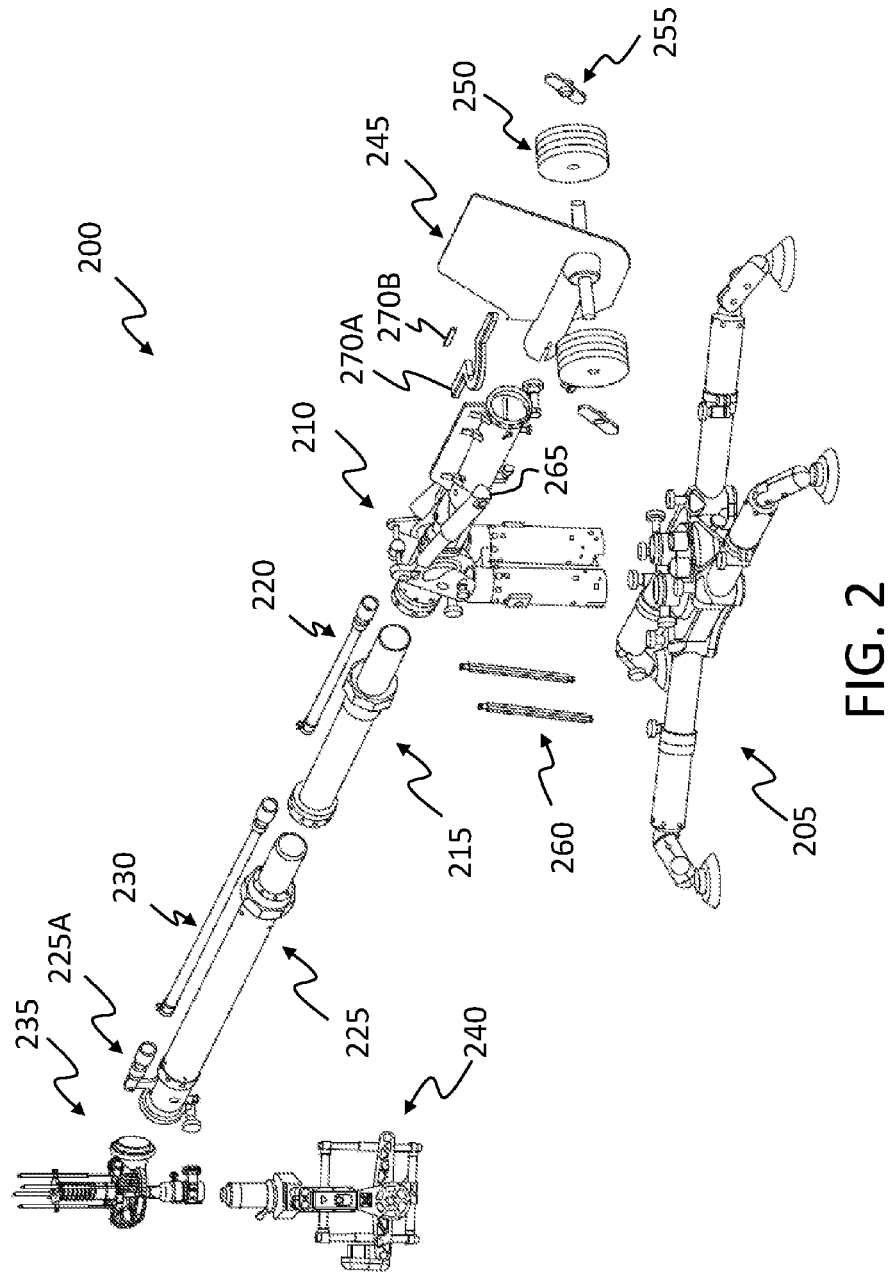
FIG. 2 depicts an exploded view of an exemplary PB-CMS.

FIG. 2 depicts an exploded view of an exemplary PB-CMS. A PB-CMS system 200 includes a mounting base subsystem 205. A central boom 210 is releasably coupled to the mounting base subsystem 205. A proximal boom 215 is releasably coupled to the central boom 210. A proximal boom stabilizer rod 220 is also releasably coupled to the central boom 210. A distal boom 225 is releasably coupled to the proximal boom 215. A distal boom stabilizer rod 230 is releasably coupled to the proximal boom stabilizer rod 220. The distal boom stabilizer rod 230 is also releasably coupled to the distal boom 225 via a distal end 225A. The distal boom 225 is releasably coupled to a suspension coupler 235. A camera mount subsystem 240 is releasably coupled to the suspension coupler 235.

The central boom 210 is also releasably coupled to a fairing 245. The fairing 245 is releasably coupled to counterweights 250. The counterweights 250 are held in place by securing knobs 255. In some embodiments, the counterweight 250 may be attached to the fairing 245 in a fixed relationship via a peg and hole configuration. In some embodiments, the counterweights 250 may be coupled to the fairing 245 in a rotatable relationship via a threaded rod and threaded coupling. In some examples, installers may employ various barbell weights as the counterweights 250.

The central boom 210 is adjustably coupled to the mounting base subsystem 205 via a stabilizer turnbuckle 260. In some examples, the stabilizer turnbuckle 260 may advantageously provide stability to the PB-CMS system 200. The stabilizer turnbuckle 260 may be operably tensioned by a user by employment of ordinary tools. Accordingly, the user may substantially decrease the amount of bouncing of the boom 210, 215 and 225, by tensioning the stabilizer turnbuckle 260.

The central boom 210 is hingedly coupled to a linear actuator 265. In some embodiments, the linear actuator may provide vertical articulation of the boom 210, 215 and 225. Accordingly, vertical articulation of the boom 210, 215 and 225 may provide vertical position control of the camera mount subsystem 240.

The PB-CMS system 200 includes an open-end wrench tool 270A. The open-ended wrench tool 270A may be employed by the user to tighten/loosen various releasable components of the boom 210, 215 and 225. The PB-CMS system 200 also includes a spanner tool 270B. The spanner tool 270B may be employed by the user to facilitate assembly of the PB-CMS system 200. For example, an installer may employ the spanner tool 270B to facilitate tightening of various knobs on the PB-CMS system 200. Employment of the spanner tool 270B may place more torque on the knobs than hand tightening. In an illustrative example, an installer may desire more torque on the knobs than what can be done without a tool, for example, where an installer's hands are wet, or very cold. In such situations, the tool may be employed for a better grip and/or better knob torque. In some embodiments, the knobs may be tightened without the use of a tool.

In some examples, a PB-CMS system may be a fully automated and remotely operated camera crane that may turn virtually any vehicle into a compatible camera vehicle without permanent modifications to any components in the PB-CMS system, nor any modifications to the vehicle. The PB-CMS system may be universally camera compatible, in that the user may operate the camera of their choosing and may use professional grade motion control. In some embodiments, the PB-CMS system may provide 360° continuous range of motion around a camera vehicle while a user operates the PB-CMS from inside the vehicle.

FIG. 2 depicts an exemplary two-boom extension embodiment, specifically by employment of the distal boom 225 and the proximal boom 215 successively coupled. In such embodiments, additional boom stabilizing rods may be employed, specifically depicted as the distal boom stabilizer rod 230 and the proximal boom stabilizer rod 220.

Figure 3A:
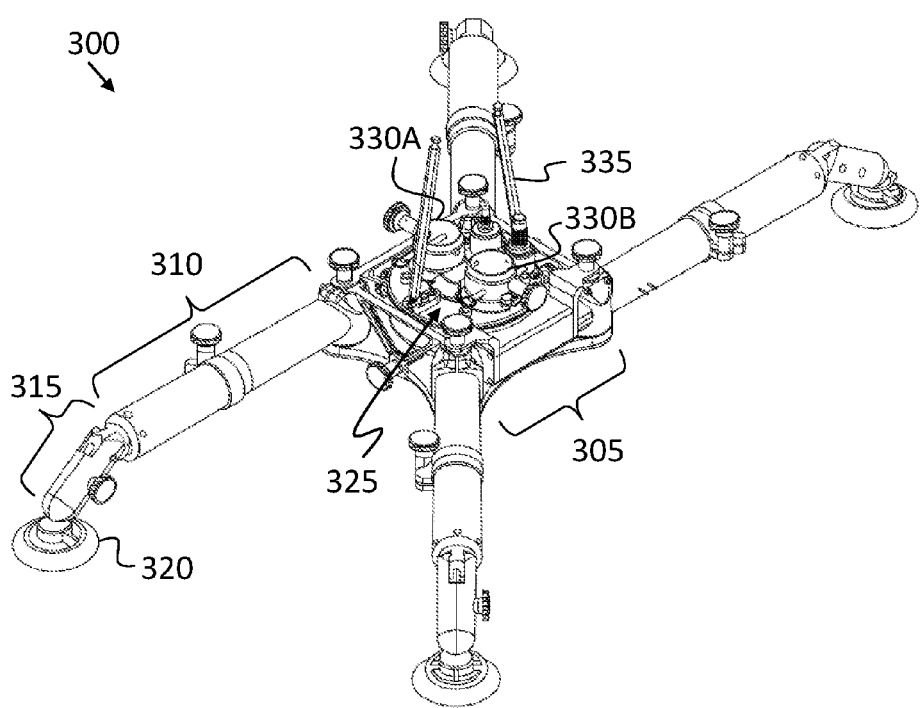
FIG. 3A depicts a perspective view of a base subsystem of an exemplary PB-CMS.

FIG. 3A depicts a perspective view of a base subsystem of an exemplary PB-CMS. A base subsystem 300 includes a central frame 305. The central frame 305 is hingedly coupled to a telescoping support leg 310 in a collection of four telescoping support legs 310. In some examples, the base subsystem 300 may include three or more telescoping legs 310. The telescoping support leg 310 is hingedly coupled to a support ankle 315. The support ankle 315 is pivotably coupled to a foot 320. The central frame 305 is rotatably coupled to a tower turntable 325. The tower turntable 325 includes a first tower socket 330A and a second tower socket 330B fixedly coupled to the upper mounting surface of the tower turntable 325. The tower turntable 325 also includes a turnbuckle support 335. The turnbuckle support 335 is rotatably coupled to the mounting surface of the tower turntable 325. In an illustrative example, the base subsystem 300 may be advantageously deployed such that forces exerted in the weaker, center of the vehicle roof, or hood, may be avoided.

In some embodiments, the coupling between the central frame 305 and the support legs 310 may be releasable. In some embodiments, the coupling may be fixed. In some embodiments, the coupling may be a twist and lock arrangement. In some embodiments, the coupling may be a screw lock. In some embodiments, the coupling may be a bayonets-style coupling. In some embodiments, the coupling may be a ball and socket joint. In some embodiments, the coupling may be a clevis joint. In some embodiments, the coupling may be a gliding joint.

In some embodiments, the coupling between the support legs 310 and the support ankle 315 may be releasable. In some embodiments, the coupling may be fixed. In some embodiments, the coupling may be a twist and lock arrangement. In some embodiments, the coupling may be a screw lock. In some embodiments, the coupling may be a bayonets-style coupling. In some embodiments, the coupling may be a ball and socket coupling. In some embodiments, the coupling may be a gliding joint.

In some embodiments, the coupling between the support ankle 315 and the foot 320 may be releasable. In some embodiments, the coupling may be fixed. In some embodiments, the coupling may be a twist and lock arrangement. In some embodiments, the coupling may be a screw lock. In some embodiments, the coupling may be a bayonets-style coupling. In some embodiments, the coupling may be a ball and socket coupling. In some embodiments, the coupling may be a clevis joint. In some embodiments, the coupling may be a gliding joint.

The PB-CMS may be releasably mountable to a vehicle roof via a plurality of leg members, each leg member extending radially from a hub to support an articulating wrist member with a distal suction attachment. In an illustrative example, the articulating wrist may adjust vertically to permit secure sealing of the suction attachment to a local vehicle roof surface. Each of the articulating wrists may couple to a corresponding distal end of one of the leg members via, for example, a ball joint. The wrist angle relative to the leg member may be releasably locked by finger operation of a locking control that, for example, also locks the angle of the wrist relative to the suction attachment. Some systems may advantageously be quickly, releasably and securely mounted from non-planar and/or irregularly shaped vehicle roofs.

Figure 3B:
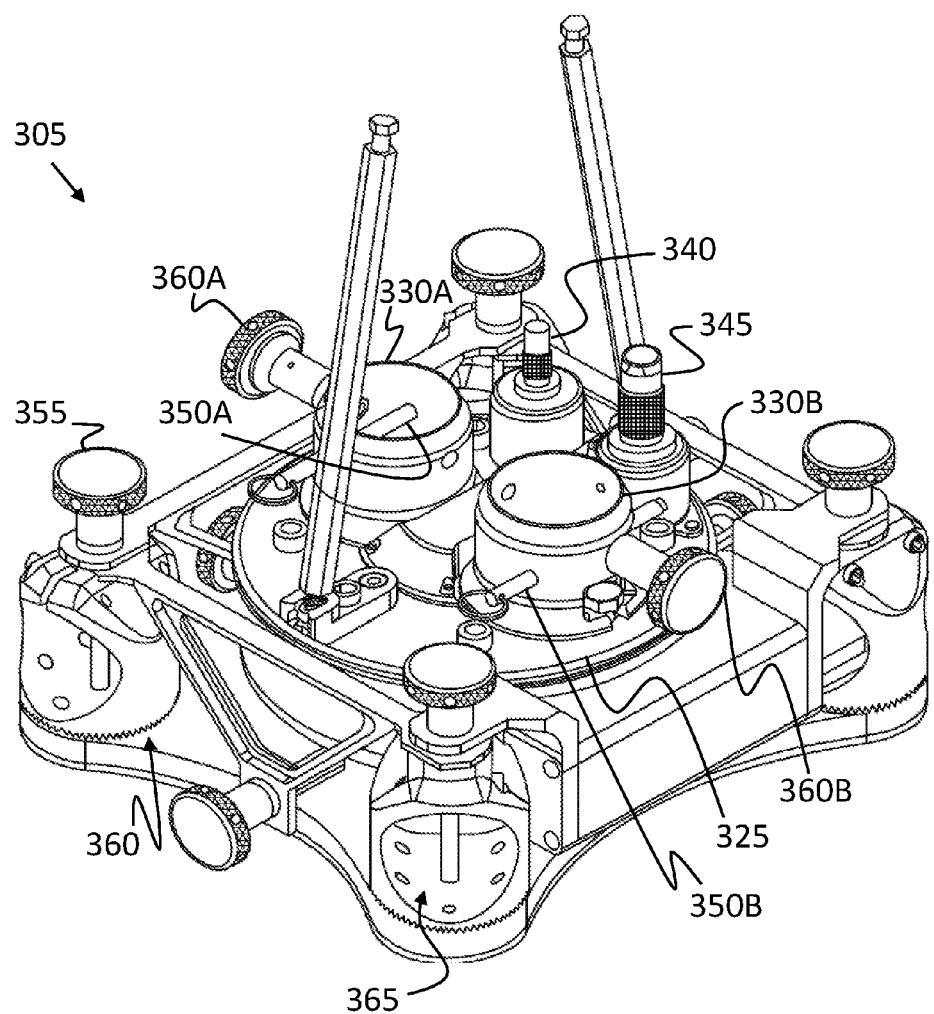
FIG. 3B depicts a perspective view of a central frame of a base subsystem of an exemplary PB-CMS.

FIG. 3B depicts a perspective view of a central frame of a base subsystem of an exemplary PB-CMS. The central frame 305 is rotatably coupled to the tower turntable 325. As described in FIG. 3A, the tower turntable 325 is fixedly coupled to the first tower socket 330A and the second tower socket 330B. The tower turntable 325 is removably coupled to a first electrical connector 340 and a second electrical connector 345. In some examples, the connectors 340 and 345 may provide power and control between the base subsystem (FIG. 3A, item 300) and connecting structures such as the central boom 210 exemplified in FIG. 2. In some embodiments, the tower turntable 325 may rotate continuously and indefinitely while providing mechanical support and electrical connections to a boom, for example, the central boom 210 exemplified in FIG. 2. The first tower socket 330A and the second tower socket 330B are releasably coupled to a safety pin 350A and a safety pin 350B.

In the illustrated embodiment, tightening and loosening of various connecting structures to the central frame 305 are accomplished through various hand knobs. For example, a hand knob 355 may be employed by an installer to tighten the releasable telescoping support leg(s) (FIG. 3, item 310). In addition to tightening/loosening the releasable telescoping support leg(s) (FIG. 3, item 310), the hand knob(s) 355 may provide hinge-stop function due to the mating teeth 360. Hand knobs 360A and 360B may be employed by the installer to tighten the releasable towers included on a central boom (e.g., FIG. 2, item 210). Accordingly, the safety pins 350A and 350B may be employed as a safety mechanism to hold the releasable towers included on a central boom (e.g., FIG. 2, item 210).

In some examples, the telescoping support leg 310 may be releasable from the central frame 305 by employment of a tool (e.g., hex key) which closes a hip clamp 365 around the support leg 310. The support leg 310 may be secured by the friction and clamping force of the hip clamp 365. Further the support leg 310 may be disengaged by loosening the hip clamp 365. In some examples, a user may keep the support legs 310 engaged with the central frame when the PB-CMS is disassembled and transported. In some examples, the hand knob(s) 355 may be employed to close the hip clamp(s) 365 to provide a quick engage/disengage action for the support legs 310.

Figure 3C:
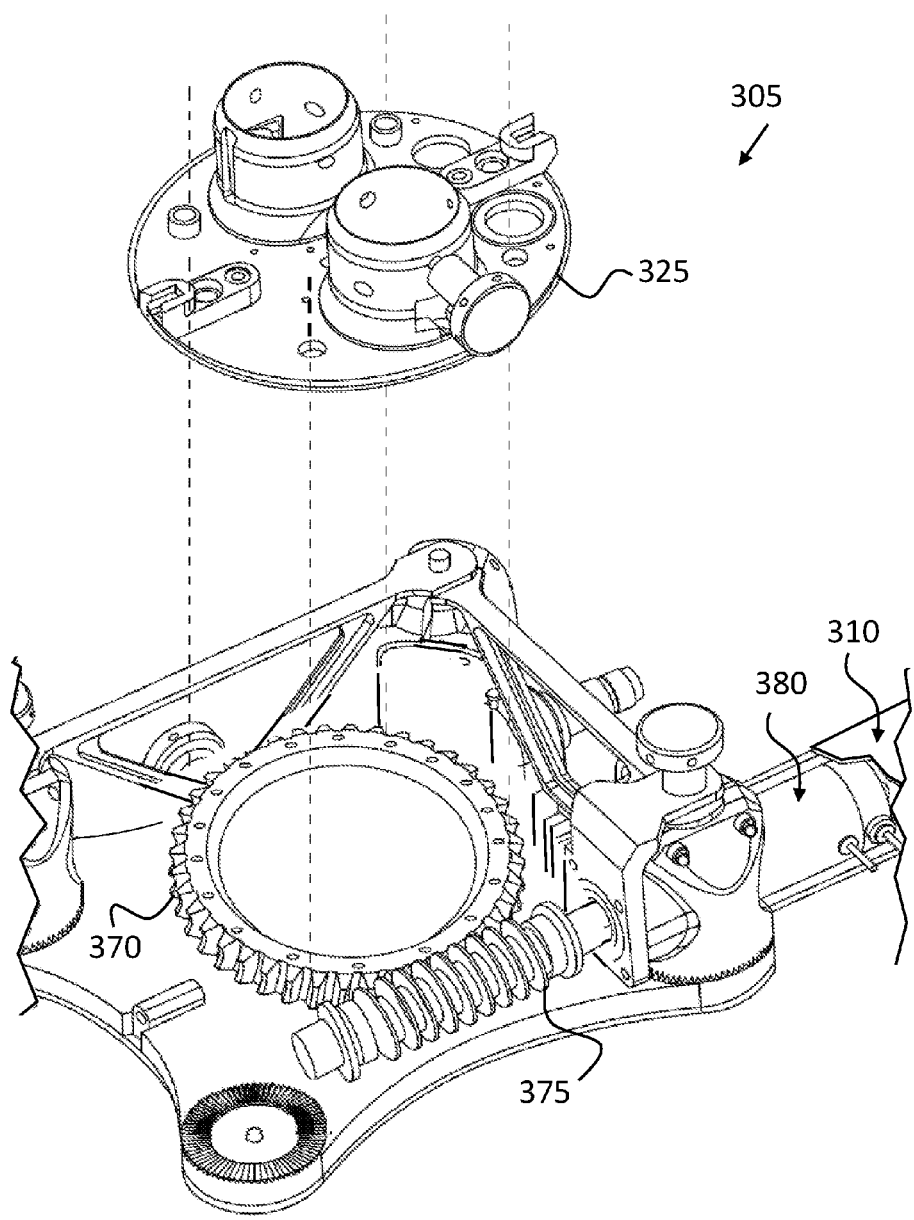
FIG. 3C depicts a perspective view of a slewing drive within a central frame of a base subsystem of an exemplary PB-CMS.

FIG. 3C depicts a perspective view of a slewing drive within a central frame of a base subsystem of an exemplary PB-CMS. The central frame 305 includes the turntable 325. The turntable 325 is fixedly coupled to a gear ring 370. The gear ring 370 is gearably engaged with a worm gear 375. The worm gear 375 is coupled to a slewing motor 380. The slewing motor is housed in one of the support legs 310. In operation, the slewing motor 380 drives the worm gear 375. The worm gear drives the gear ring 370. The gear ring drives the turntable 325. In some embodiments, the turntable is coupled to a boom subsystem, for example, the partial PB-CMS shown in FIG. 1C, item 105C. The boom subsystem will be further described in FIG. 6A. The slewing motor 380 is operable to position the turntable 325, and thus the PB-CMS (FIG. 1A, item 105A) within a full 360° angular swing around the central frame 305, and thus around a vehicle, for example the vehicle in FIG. 1A, item 110. In some examples, the turntable may provide unlimited rotations to the PB-CMS (FIG. 1A, item 105A).

Figure 4A:
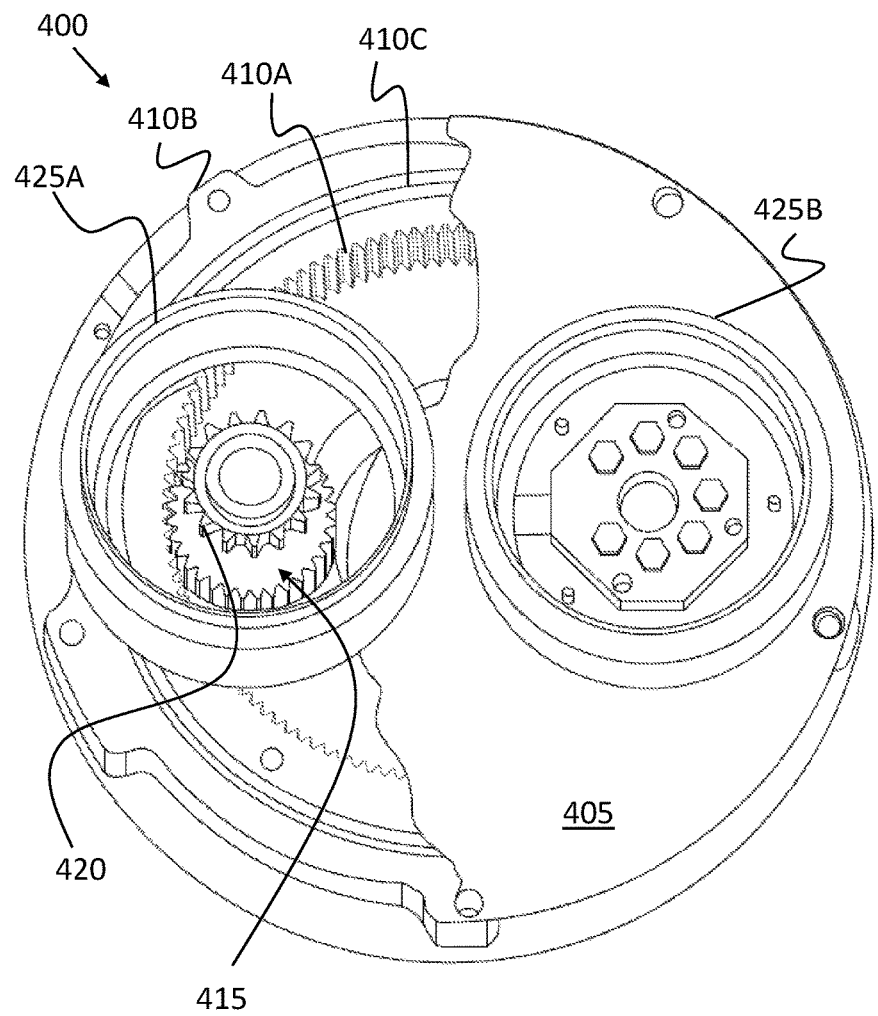
FIG. 4A depicts a perspective view of mechanical and electrical interfaces of a base subsystem of an exemplary PB-CMS.

FIG. 4A depicts a perspective view of mechanical and electrical interfaces of a base subsystem of an exemplary PB-CMS. A drive mechanism 400 is included beneath a tower turntable 405 which provides rotation for a central boom (e.g., FIG. 2, item 210). The drive mechanism 400 includes a central gear ring 410A. The central gear ring 410A is fixedly coupled to a central frame (e.g., FIG. 3A, item 305). The central gear ring 410A is rotatably engaged with a drive frame 410B via a bearing 410C. As such, the central gear ring 410A remains in a fixed relationship with the central frame (e.g., FIG. 3A, item 305). The central gear ring 410A is gearably engaged with a dynamic drive gear 415. The dynamic drive gear 415 is fixedly coupled to a transfer coupling 420. In some embodiments, the transfer coupling 420 may be provided torque from a removably coupled motor with an integrated mating coupling.

In an illustrative example, power from a coupled motor may drive the transfer coupling 420. The power from the coupled motor may transfer to the central gear ring 410A via the dynamic drive gear 415. Since the central gear ring 410A is in a fixed position, the dynamic drive gear 415 travels around an inner perimeter of the fixed central gear ring 410A. Since the coupled motor drives the transfer coupling 420, the coupled motor travels around the inner perimeter of the central gear ring 410A. In some embodiments, the coupled motor may be included in a central boom (e.g., FIG. 2, item 210). Accordingly, movement of the coupled motor may provide motion to an entire boom subsystem (e.g., FIG. 1C, item 120).

As mentioned above, the drive mechanism 400 is included beneath the tower turntable 405 which provides rotation for a central boom (e.g., FIG. 2, item 210). The connection to a central boom (e.g., FIG. 2, item 210) is facilitated by a boom connection ring 425A and a boom connection ring 425B. The tower turntable 405 may be substantially disk-shaped and may be fixedly coupled to both the drive frame 410B and the boom connection rings 425A and 425B. A central boom (e.g., FIG. 2, item 210) may be provided rotation via the connection to the boom connection ring 425A, and may be provided electrical power and signal coupling via the connection to the boom connection ring 425B.

In some examples, the drive mechanism 400 may be a slewing drive. In such examples, the motor may be housed within the drive frame 410B. Further the motor may be coupled to a worm gear, driving a gear ring. The gear ring may be configured with gear teeth facing the outside of the perimeter of the gear ring.

FIG. 4B depicts a cross-sectional elevation view of a drive mechanism and quick disconnect tower of a base subsystem of an exemplary PB-CMS. As depicted, an electrical tower 430A and a mechanical tower 430B are operably connected to a center module 435. A base electrical connection 440 electrically connects to a tower electrical connector 445 to permit electrical communication between the center module 435 and a central boom (e.g., FIG. 2, item 210) through electrical paths in the electrical tower 430A. The transfer coupling 420 is coupled to a motor 450. The transfer coupling 420 is mechanically engaged with a tower gear coupling 455 such that the transfer coupling 420 and the tower gear coupling 455 substantially align. In an illustrative example, as a user is assembling a central boom (e.g., FIG. 2, item 210) to the center module 435, rotational misalignments may translate into rotation of the motor 450 or rotation of the pair of towers 430A and 430B. The center module 435 may provide a base disconnect interface (e.g., the boom connection rings 425A and 425B or a housing around these) which may advantageously provide installation guidance to ensure proper alignment between the mechanical and electrical connections between a central boom (e.g., FIG. 2, item 210) and a base subsystem (e.g., FIG. 3A, item 300). As such, the releasable tower mount within the center module 435 may correct for tower-to-module misalignments while providing rigid support to hold the towers 430A and 430B in place after connection.

In some examples, various electrical modules may be located on the center module 435. The electrical modules may exist on the tower turntable 405. In such examples, since the center module 435 and the tower turntable 405 turn with the pair of towers 430A and 430B, basic wiring methods may be employed to provide connection between electrical components on a central boom (e.g., FIG. 2, item 210) to the center module 435 and/or to the tower turntable 405.

In some embodiments, certain components may be recessed within the towers 430A and 430B. As such, the towers 430A and 430B may protect the tower electrical connector 445 and the tower gear coupling 455 from physical damage, for example, when dropped or stepped on. In some embodiments, the towers 430A and 430B may protect the included mechanical elements and the electrical elements against weather hazards.

The tower turntable 405 may be configured to rotate 360° continuously (unlimited rotations). Further, a central boom (e.g., FIG. 2, item 210) coupled to the tower turntable 405 may rotate accordingly.

In an illustrative example, the towers 430A and 430B may be quickly connected and disconnected by an installer to the tower turntable 405. In various embodiments, the mechanical interface connection (the tower gear coupling 455) and electrical interface connections (the tower electrical connector 445) may be internal to the boom towers 430A and 430B.

Figure 5A:
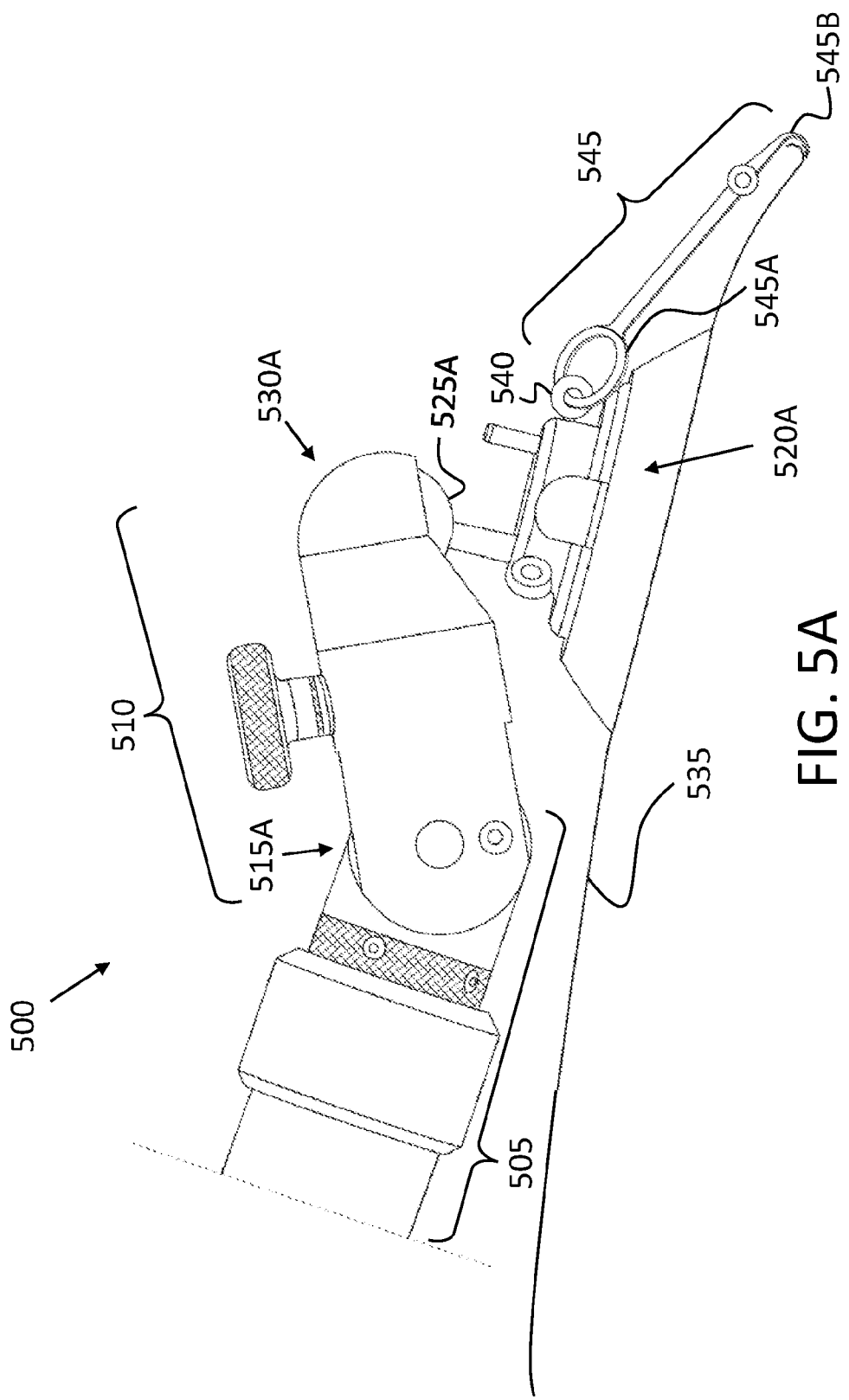
FIG. 5A depicts an elevation view of a support ankle of a base subsystem of an exemplary PB-CMS.

FIG. 5A depicts an elevation view of a support ankle of a base subsystem of an exemplary PB-CMS. A flexible base joint 500 includes a support leg 505. The support leg 505 is hingedly coupled to a support ankle 510. An elbow clevis joint 515A is inherently created between the support leg 505 and the support ankle 510. The support ankle 510 is pivotably coupled to a mounting foot 520A. The mounting foot 520A includes a ball 525A. A ball joint 530A is inherently created between the ball 525A and the support ankle 510. The elbow clevis joint 515A in conjunction with the ball joint 530A may advantageously adjust the mounting distance of the mounting foot 520A to a mounting surface 535. The mounting foot 520A is fixedly coupled to an eyelet 540. The eyelet 540 is coupled to a strap 545. The strap includes a clip 545A on a proximal end. The strap 545 includes a hook 545B on a distal end. In some embodiments, the hook 545B may be engaged with a structure on a vehicle (e.g., gutter, door, window, wheel well) which may advantageously secure the mounting foot 520A in place.

In some examples, the strap 545 may include a ratchet, which may operably shorten, and thereby tension the strap. In some installation examples, the installer may secure the mounting feet 520A by strapping through the inside of a vehicle to a mounting foot on the other side.

The strap 545, which may be in a hooked relationship with a vehicle frame, may advantageously keep the PB-CMS from tipping or peeling away from the mounting foot 520A. Users may find benefit with the strap 545 in various situations (e.g., high acceleration, aggressive cornering, high speeds, high winds). The strap 545 may provide physical securing of a PB-CMS, and may exist as a safety measure, holding the PB-CMS to a vehicle. The strap 545 may provide the outlined advantages without permanent installation or damage to the vehicle.

FIG. 5B depicts a cross-sectional elevation view of a support ankle of a base subsystem of an exemplary PB-CMS. The flexible base joint 500 includes a contour adjustment lock hand knob 550A. The contour adjustment lock hand knob 550A is rotatably engaged with the support ankle 510. The contour adjustment lock hand knob 550A is coupled to a threaded rod 555A. The threaded rod 555A is in threaded engagement with a threaded ram 560A. The threaded ram 560A includes an integrated inclined facet 560B. In some embodiments, the threaded rod 555A may include an integrated cone-shaped end instead of the integrated inclined facet 560B. The inclined facet 560B is in slidable engagement with a clevis ramp pin 565 and a ball pin 570.

In operation, the threaded ram 560A moves downward with respect to FIG. 5B in response to rotation of the contour adjustment lock hand knob 550A driving the threaded rod 555A downward. In response to the downward movement of the threaded rod 555A, and accordingly, the downward movement of the threaded ram 560A, the clevis ramp pin 565 and the ball pin 570 move outward and away from each other. The outward movement provides a friction lock between the support ankle 510 and the ball 525A within the ball joint 530A. The outward movement also provides a friction lock between the support ankle 510 and the support leg 505 within the elbow clevis joint 515A. In some embodiments, both joints 515A and 530 may advantageously lock into place simultaneously. Accordingly, a base subsystem (e.g., FIG. 3A, item 300) may be level-adjustable by employment of the support ankle 510 and the contour adjustment lock hand knob 550A. In addition, various embodiments may house the locking joints 515A and 530 internally, which may advantageously eliminate pinch-points and/or enhance weather resistance.

In an illustrative example, the elbow clevis joint 515A in conjunction with the ball joint 530A may allow the mounting foot 520A to seat itself to a mounting surface at any angle, before the contour adjustment lock hand knob 550A is locked into place. In some examples, a user may employ the contour adjustment lock hand knob 550A using one hand, and may tighten both joints 515A and 530A simultaneously. In an illustrative example, the mounting foot 520A may include the ball joint 530A that allows the mounting foot 520A to pivot and/or swivel substantially with relationship to the support ankle 510, to match the attitude of a mounting surface. In operation, the exemplary embodiment of FIG. 5A depicts the mounting foot 520A mounting to the tilted and curved mounting surface (FIG. 5A, item 535).

In some embodiments, employment of the mounting foot 520A may advantageously provide cushioning between a PB-CMS and a mounting surface, along with a strong coupling bond. For example, the mounting foot 520A may be implemented as a vacuum cup. The vacuum cup implementation may advantageously provide a strong coupling bond with low-effort attachment and removal. Further, in some embodiments, an interface between the PB-CMS and the mounting surface may be implemented with hook-and-loop.

In some embodiments, employment of the mounting foot 520A may advantageously provide cushioning between a PB-CMS and a mounting surface without a bond. For example, in some embodiments, the mounting foot 520A may be implemented with a rubber foot. The rubber foot may advantageously provide slide resistance and straightforward implementation. Implementation of the rubber foot may accordingly rely on the securing strap (FIG. 5A, item 545) to secure the PB-CMS to the mounting surface. Further, in some embodiments, the mounting foot 520A may be implemented with a soft pad (e.g., felt).

Accordingly, each implementation of the mounting foot 520A may provide a method of coupling the PB-CMS to the mounting surface(s) without damage to the mounting surface. In some examples, a base subsystem (e.g., FIG. 3A, item 300) may couple with virtually any vehicle roof type.

Figure 5C:
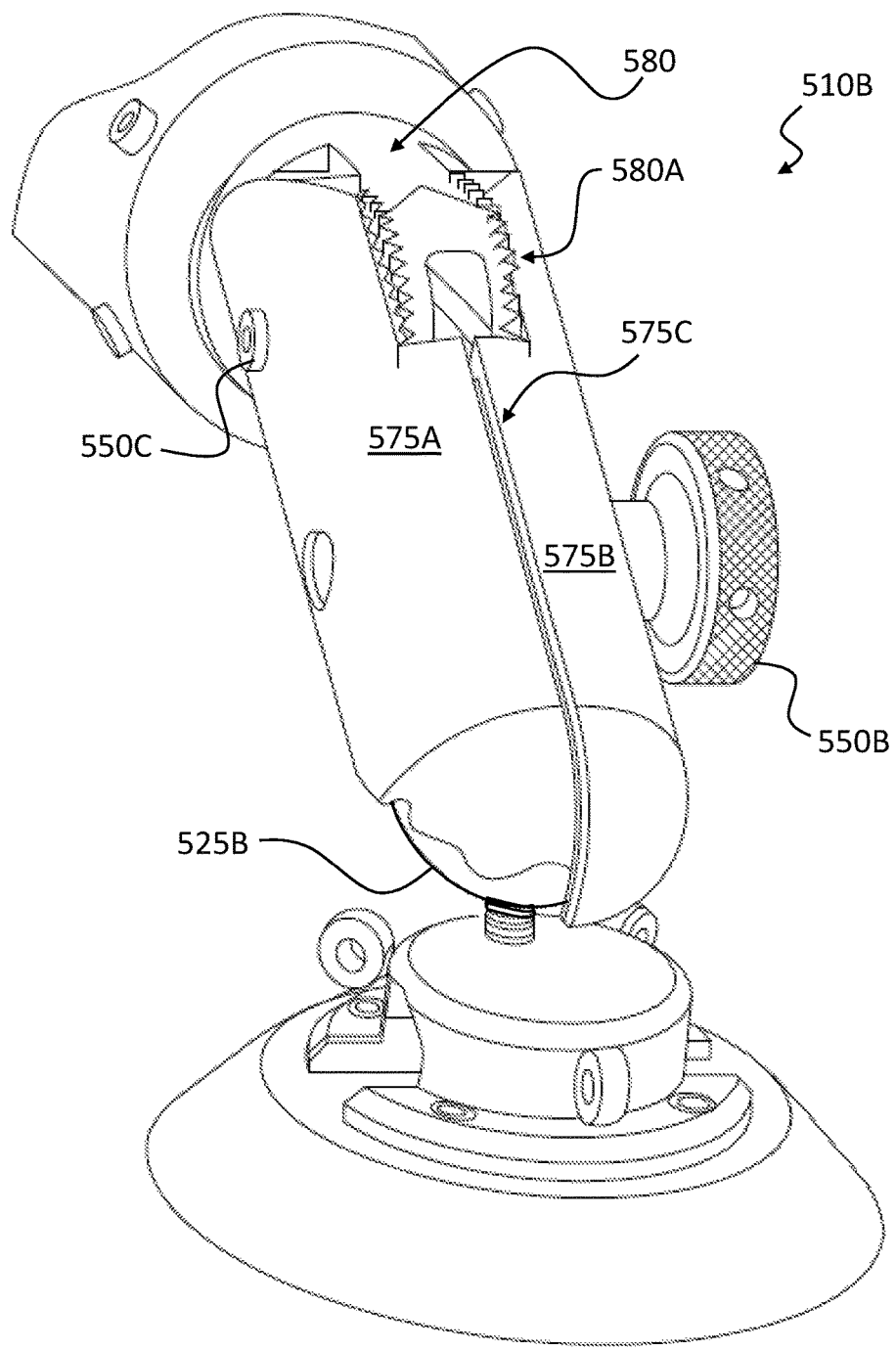
FIG. 5C depicts a perspective view of a support ankle of a base subsystem of an exemplary PB-CMS.

FIG. 5C depicts a perspective view of a support ankle of a base subsystem of an exemplary PB-CMS. A support ankle 510B includes right housing 575A and a left housing 575B. The left and right housings 575A and 575B are configured to produce a small gap 575C when assembled into the support ankle 510B. The distal end of housing 575A is shown cut-away to illustrate that the left and right housings 575A and 575B are proximate to the ball 525B. The left and right housings 575A and 575B are cinched together with a knob 550B near a distal end and with a screw 550C on a proximal end. The proximal ends of the left and right housings 575A and 575B form a clevis joint surrounding a leg joint member 580. The facing surfaces of the proximal ends of the left and right housings 575A and 575B and the leg joint member 580 include a set of grip teeth 580A.

Figure 5D:
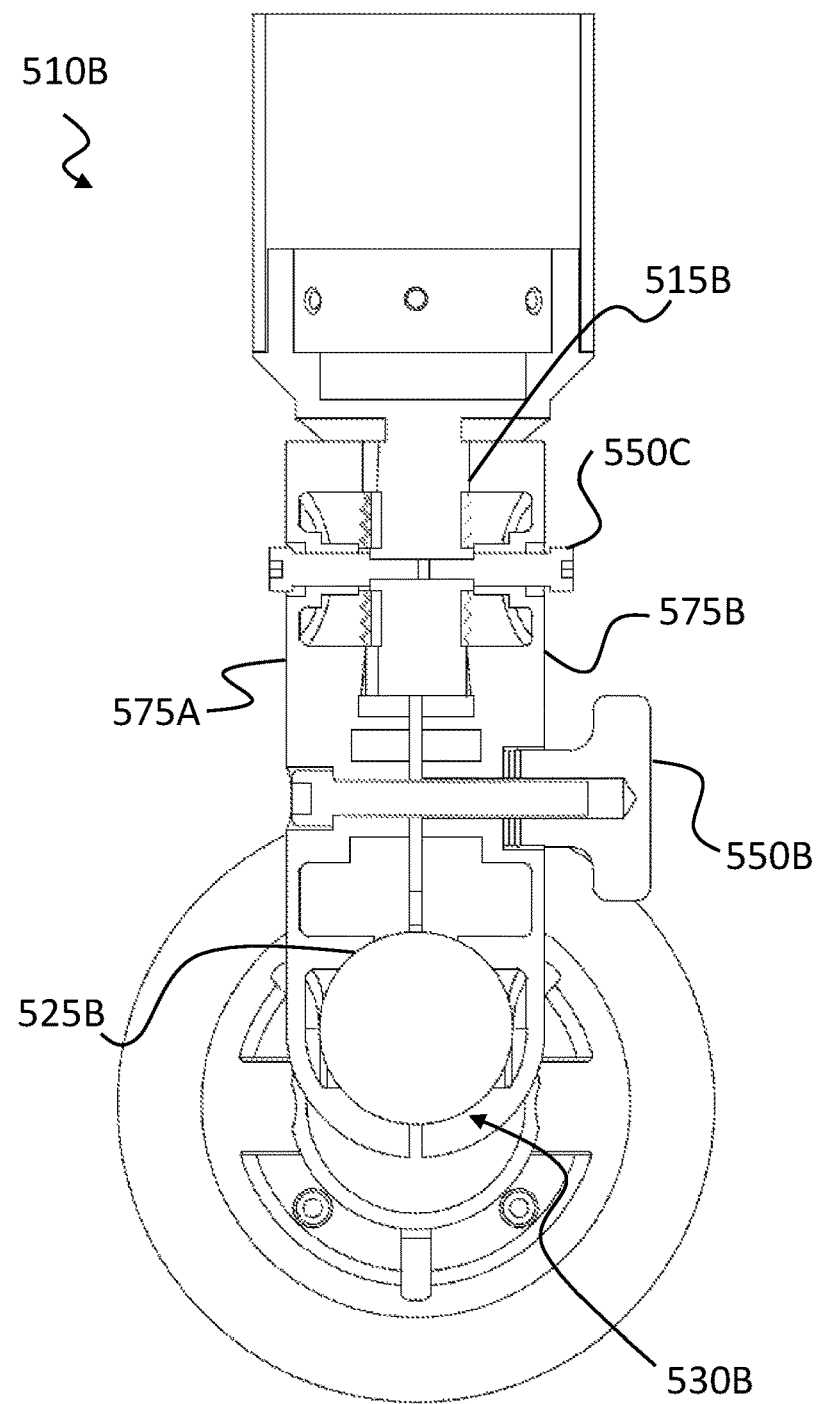
FIG. 5D depicts a cross-sectional perspective view of a support ankle of a base subsystem of an exemplary PB-CMS.

FIG. 5D depicts a cross-sectional perspective view of a support ankle of a base subsystem of an exemplary PB-CMS. In this view, further detail is illustrated for this exemplary embodiment. The knob 550B can be seen extending through the left and right housings 575A and 575B. As the knob 550B is tightened by an installer, the two housings 575A and 575B are brought together, cinching the ball 525B and locking the ball joint 530B in place. Accordingly, the screw 550C can be seen extending through the left and right housings 575A and 575B. As the screw 550C is tightened by an installer, the two housings 575A and 575B are brought together, locking a clevis joint 515B in place via the grip teeth (FIG. 5C, item 580A).

Figure 5E:
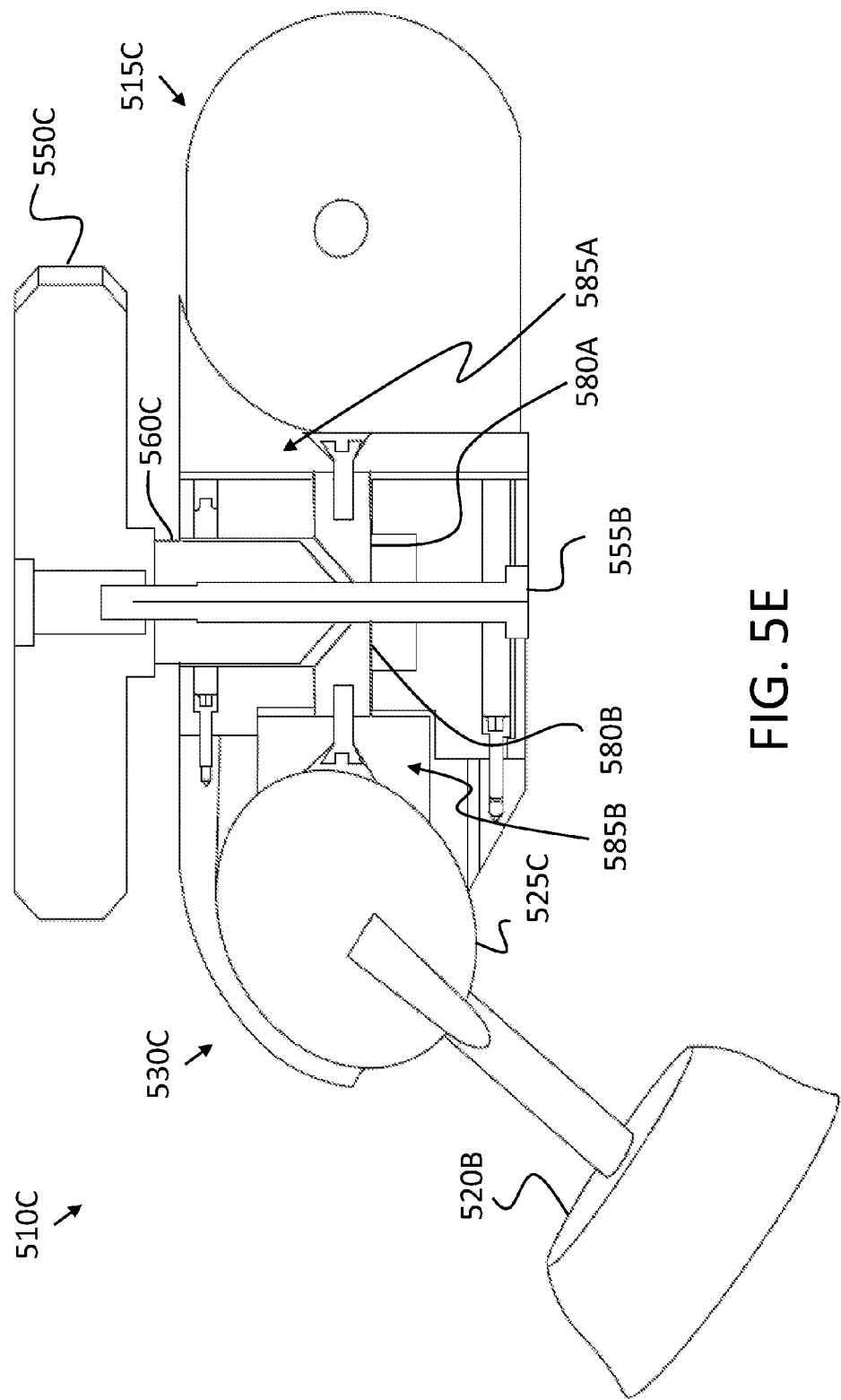
FIG. 5E depicts an elevation view of a support ankle of a base subsystem of an exemplary PB-CMS.

FIG. 5E depicts an elevation view of a support ankle of a base subsystem of an exemplary PB-CMS. A support ankle 510C includes a ball joint 530C, and a clevis joint 515C. The support ankle 510C is pivotably coupled to a mounting foot 520B via the ball joint 530C. The mounting foot 520B includes a ball 525C. The clevis joint 515C in conjunction with the ball joint 530C may advantageously adjust the mounting distance of the mounting foot 520B to a mounting surface.

The support ankle 510C includes a locking knob 550C. The locking knob 550C is threadably engaged with a threaded rod 555B. As the knob 550C is tightened, it moves downward, forcing a ram 560C into a clevis piston 580A and a ball piston 580B, both with inclined facets. In response to the ram 560C force, the pistons 580A and 580B move outward, away from the ram 560C. The clevis piston 580A is fixedly coupled to a clevis brake pad 585A. The ball piston 580B is fixedly coupled to a ball brake pad 585B. As the clevis piston 580A is forced outward, it forces the clevis brake pad 585A into the clevis joint 515C where it contacts the distal end of a leg (not shown) locking it in place. Further, as the ball piston 580B is forced outward, it forces the ball brake pad 585B onto the ball joint 530C where it contacts the ball 525C, locking it in place. Operably, as the locking knob 550C is tightened, the ball joint 530C, and the clevis joint 515C are locked into place simultaneously. In some examples, the locking knob 550C may be fixed to or integrally formed with the rod 555B.

Figure 6A:
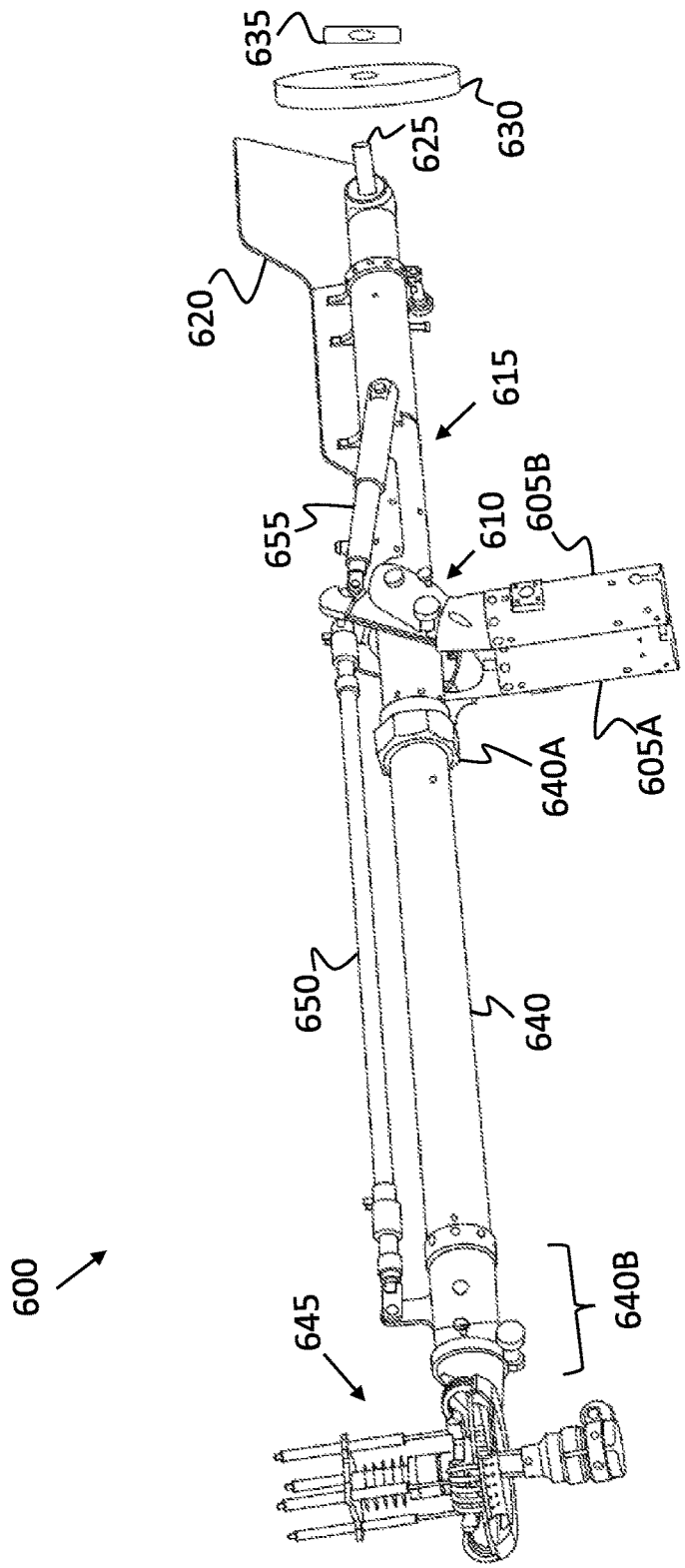
FIG. 6A depicts a perspective view of a boom subsystem of an exemplary PB-CMS.

FIG. 6A depicts a perspective view of a boom subsystem of an exemplary PB-CMS. A boom subsystem 600 includes a first tower 605A and a second tower 605B. In some embodiments, the towers 605A and 605B may be keyed in such a way that they may not be interchanged and may not be installed upside down. The towers 605A and 605B are fixedly coupled to a boom shoulder 610. In some examples, the towers 605A and 605B may be releasably coupled to the boom shoulder 610. The boom shoulder 610 is hingedly coupled to a central boom 615. In some examples, the boom shoulder 610 may be hingedly and releasably coupled to the central boom 615. The central boom 615 is releasably coupled to a fairing 620. The fairing 620 is fixedly coupled to a counterweight shaft 625. In some examples, the counterweight shaft 625 may be threaded. The counterweight shaft 625 receives a removable counterweight 630. The removable counterweight 630 is captured between the fairing 620 and a capture nut 635. In some embodiments, the capture nut 635 may be threadably engaged to the counterweight shaft 625. In some examples, the counterweight 630 may be threaded, eliminating the need for the capture nut 635.

The central boom 615 is coupled to a boom extension 640 via a coupling collar 640A. In some embodiments, the coupling collar 640A, may be threaded. The boom extension 640 is fixedly coupled to a boom coupler 640B. In some embodiments, the boom extension 640 may be releasably coupled to the boom coupler 640B. In some embodiments, one or more boom extensions 640 may be coupled to extend the overall reach of the boom subsystem 600. (Refer to FIG. 2.) The boom coupler 640B is fixedly coupled to a suspension coupler 645. In some embodiments, the suspension coupler 645 may be releasably coupled to the boom coupler 640B.

The boom shoulder 610 is hingedly attached to a stabilizing rod 650. The boom shoulder 610 is also hingedly coupled to a linear actuator 655. The linear actuator 655 may provide a powerful and rigid method of vertically articulating the boom 615 and 640.

In some embodiments, the boom subsystem 600 may position various cameras relative to a vehicle. Users of the boom subsystem 600 may employ one or more boom extensions 640. Users of the boom subsystem 600 may employ a variety of boom lengths. The boom subsystem 600 may house various electronic motors, servos, actuators and/or control and drive circuitry. By employment of the counterweight 630, the boom subsystem 600 may counterweight a payload (e.g., one or more cameras) and may be counterbalanced against various wind forces.

The tower sockets (FIG. 3B, items 330A and 330B) accept the towers 605A and 605B on the boom subsystem 600, and make a mechanical connection between them. In some embodiments, various electrical connections may be accomplished via external wires that connect different modules together. In some examples, various electrical connections may be part of the tower sockets (FIG. 3B, items 330A and 330B). The towers 605A and 605B may be tightened to the tower sockets (FIG. 3B, items 330A and 330B) by employment of hand knobs (FIG. 3B, item 360A and 360B). The towers 605A and 605B may be additionally secured by the safety pins (FIG. 3B, items 350A and 350B).

In some embodiments, the boom subsystem 600 may provide a main load-bearing structure. The structure of the boom subsystem 600 may extend away from the boom shoulder 610 in opposite directions to support both the payload (camera and accessories), and the counter weighting (e.g., battery, physical counterweight 630) at the opposite end. In some examples, the boom 615 and 640 that is counterweighted may provide even distribution of radial and thrust loads on the base of the PB-CMS. Accordingly, the boom 615 and 640 that is counterweighted may reduce the load forces required for vertical articulation.

In some embodiments, the boom subsystem 600 may include pivoting elbows to smoothly transfer force as the boom subsystem 600 raises and lowers. In some embodiments, various accommodations for electrical hardware (e.g., wire harnesses, sensors, swing motor) may be included inside the structural elements of the boom subsystem 600. In some embodiments, the mechanisms by which the PB-CMS operates may be completely enshrouded from an operator.

Figure 6B:
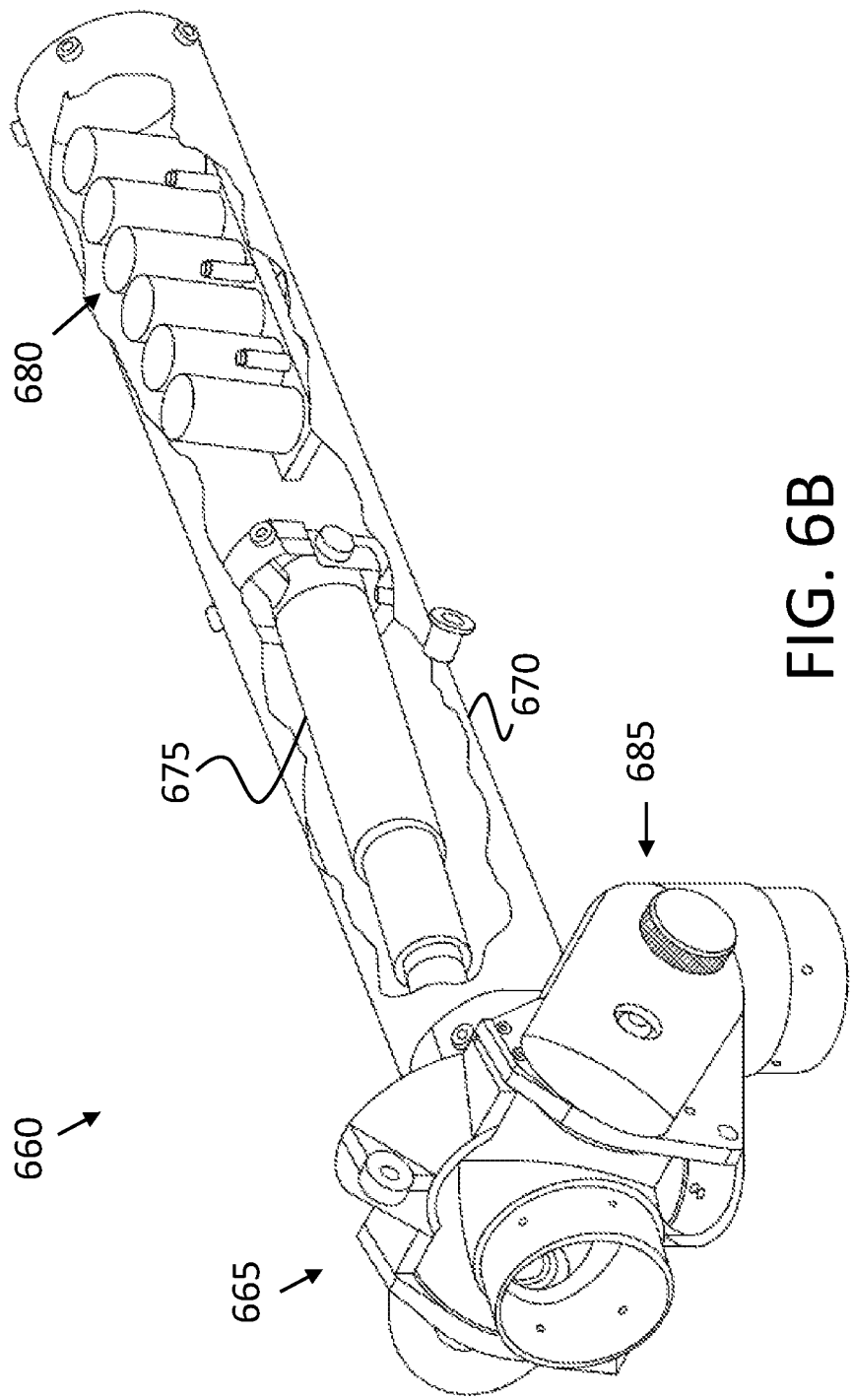
FIG. 6B depicts a perspective view of a central boom of a boom subsystem of an exemplary PB-CMS.

FIG. 6B depicts a perspective view of a central boom of a boom subsystem of an exemplary PB-CMS. A central boom 660 includes a boom shoulder 665. The boom shoulder 665 is fixedly coupled to a central boom body 670. The central boom body 670 houses a linear actuator 675. The central boom body 670 also houses a bank of energy storage devices 680. The linear actuator 675 may be employed to raise and lower the central boom 660. Accordingly, all coupled components to the central boom 660 may be vertically articulated. The storage devices 680 may be the power source for the PB-CMS. The storage devices 680 may be charged via a vehicle power system (e.g., cigarette lighter). In some embodiments, the storage devices 680 may be charged via mains power (AC household wall power). In some examples, the storage devices 680 may be electrical capacitors. In various examples, the storage devices may be batteries of various technologies (e.g., lead acid, nickel cadmium, nickel metal hydride, lithium polymer). In an illustrative example, the central boom 660 may house the energy storage devices to protect them against weather elements (e.g., rain, snow). In some examples, the energy storage devices 680 may be located elsewhere within the PB-CMS. For example, the energy storage devices 680 may be located in the distal boom (FIG. 2, item 225). In some examples, the energy storage devices 680 may be located as an external attachment, for example, on the horizontal members of the central boom (FIG. 2, item 210). Further, in some implementations, the energy storage devices 680 may be located within the central frame (FIG. 3, item 305).

The central boom 660 also includes a pivoting elbow 685. The pivoting elbow 685 supports a boom axle which hingedly couples the central boom 660 to the towers (FIG. 6A, items 605A and 605B).

Figure 7:
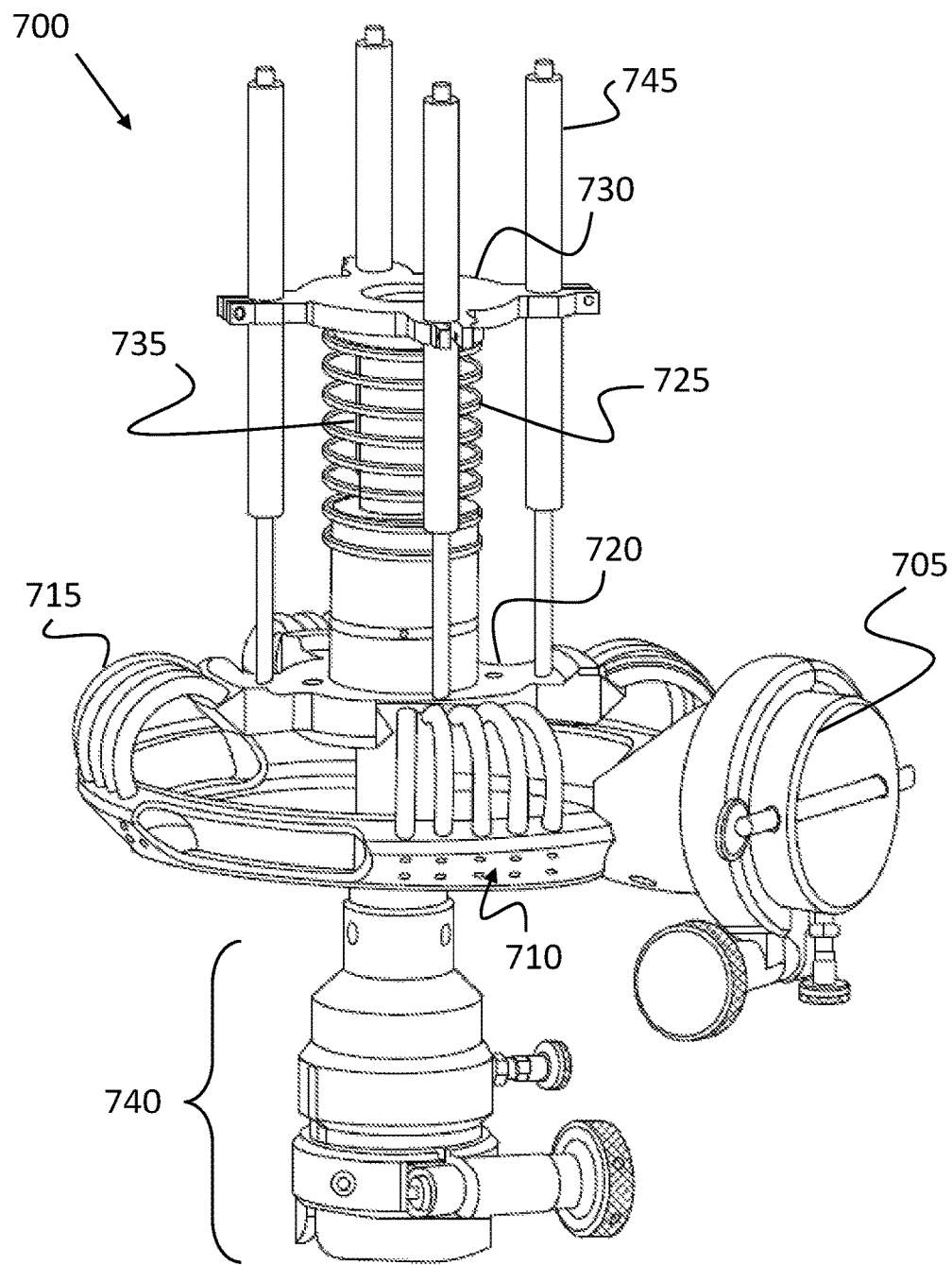
FIG. 7 depicts a perspective view of a suspension coupler of a boom subsystem of an exemplary PB-CMS.

FIG. 7 depicts a perspective view of a suspension coupler of a boom subsystem of an exemplary PB-CMS. A suspension coupler 700 includes a boom-mount coupler 705. The boom-mount coupler 705 is fixedly coupled to a mounting ring 710. The mounting ring 710 is fixedly coupled to a rope damper 715 on a proximal end. The rope damper 715 is fixedly coupled on a distal end to a bridge 720. The bridge 720 is engaged with a suspension spring 725 at a proximal end. The suspension spring 725 supports a shaft flange 730. The shaft flange 730 is fixedly coupled with a shaft body 735. The shaft body 735 is fixedly coupled to a head quick disconnect (HQD) socket 740.

In operation, the chain of fixedly coupled components from the HQD socket 740 to the shaft flange 730, may articulate vertically, the motion being governed by the suspension spring 725 captured between the bridge 720 and the shaft flange 730. The rope damper(s) 715 may provide the fixedly coupled components mentioned as well as the suspension spring 725 and the bridge 720, to swing in a dampened manner.

In an illustrative example, the suspension coupler 700 may isolate a camera from the vibrations of a vehicle and or a driving surface. The suspension coupler 700 may provide vertical movement via the of the suspension spring 725 and the rope dampers 715. The rope dampers 715 may allow the HQD socket 740 to swing slightly. The rope dampers 715 may also mitigate any shock loading.

In the exemplary embodiment depicted in FIG. 7, the shaft flange 730 may act as a guide plate. A damper 745 is slidably engaged with the shaft flange 730. The dampers 745 are fixedly coupled to the bridge 720 and may be peripheral to the suspension spring 725. The dampers 745 may slow and smooth the motion of a sprung mass (e.g., camera) that the installer may connect to the HQD socket 740. In some examples, the dampers 745 may provide a rotational limit to the bridge 720, and thus to the HQD socket 740.

In some embodiments, the PB-CMS may employ one or more rope dampers 715. For example, two rope dampers 715 in each of four orthogonal locations may be employed. In some embodiments, the rope dampers 715 may be customizable for a particular employed camera weight. For example, the rope dampers 715 may be user replaceable, and as such, the user may customize the suspension coupler to work with a camera of their choice. Further, the PB-CMS may include a variety of rope dampers 715.

Figure 8:
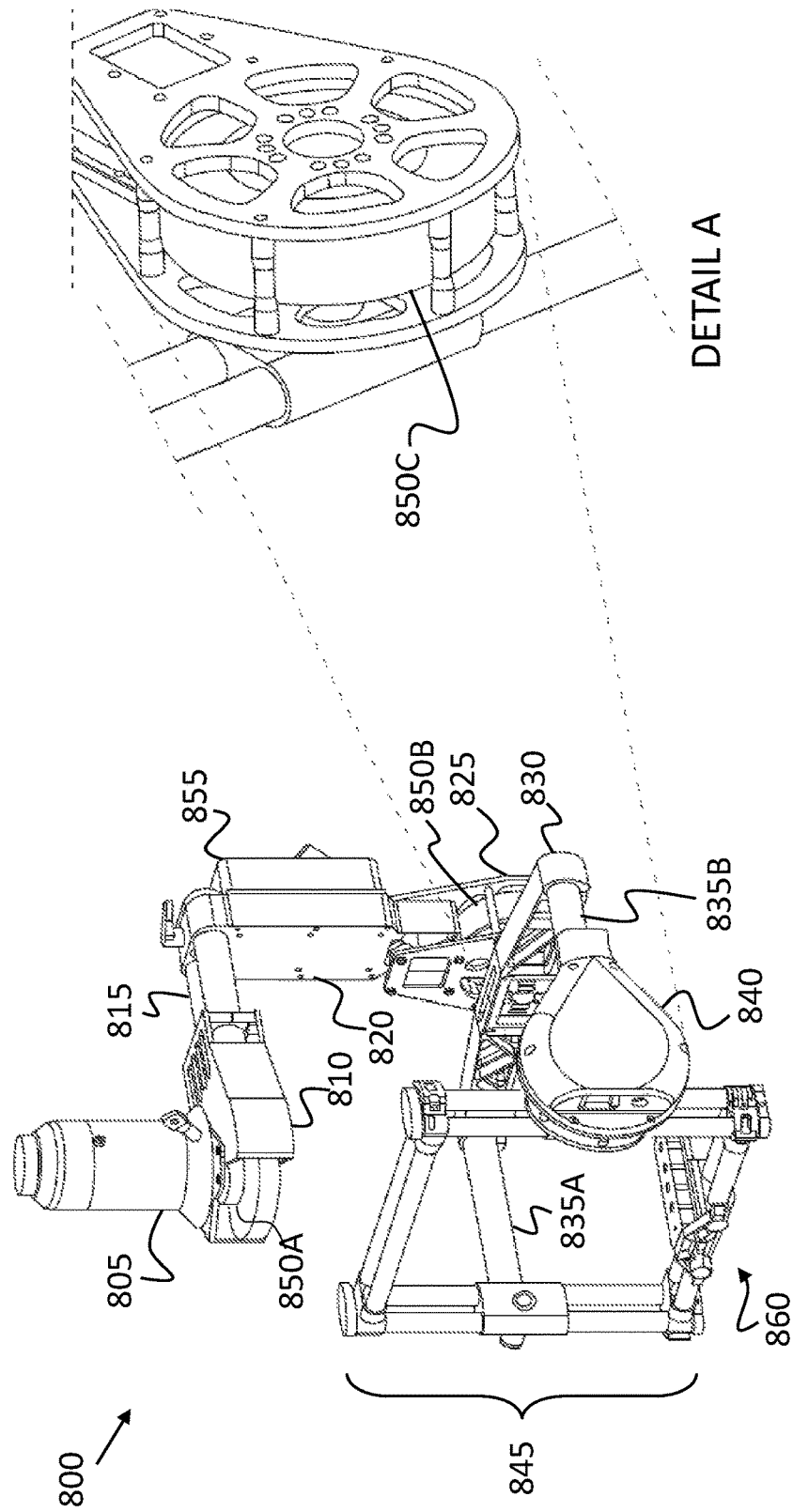
FIG. 8 depicts a perspective view of a camera mount subsystem of an exemplary PB-CMS.

FIG. 8 depicts a perspective view of a camera mount subsystem of an exemplary PB-CMS. A camera mount subsystem 800 includes a head quick disconnect (HQD) plug 805. The HQD plug 805 employs both electrical and mechanical connections, described in detail with reference to FIG. 4A and FIG. 4B of U.S. Provisional Application Ser. No. 62/371,573, titled "Vehicular Camera Mount," filed by Zachary C. Nelson, et al., on Aug. 5, 2016.

A pan drive 810 is rotatably coupled to the HQD plug 805. The pan drive 810 is fixedly coupled to a horizontal pan support member 815. The horizontal pan support member 815 is fixedly coupled to a vertical pan support member 820. The vertical pan support member 820 is fixedly coupled to a roll drive 825. The roll drive 825 is rotatably coupled to a posterior roll support member 830. The posterior roll support member 830 is fixedly coupled to a right roll support member 835A. The posterior roll support member 830 is also fixedly coupled to a left roll support member 835B. The left roll support member 835B is fixedly coupled to a tilt drive 840. The tilt drive 840 is rotatably coupled to a camera support frame 845. Completing the circuit, the camera support frame 845 is rotatably coupled to the right roll support member 835A. As depicted, the vertical pan support member 820 is coupled to an electronics cover 855.

In an illustrative example, the user may make a quick connection of the camera mount subsystem 800 to the suspension coupler (FIG. 7, item 700) by employment of the HQD plug 805. Users may find benefit in quickly changing cameras on and off the boom subsystem (FIG. 6A, item 600) without the need to manage electrical cable interfaces by employment of the HQD plug 805.

In some embodiments, the camera mount subsystem 800 may hold a camera subsystem in a user-desired position. In some examples, the camera mount subsystem 800 may pan, tilt, and roll a mounted camera subsystem. In some implementations, the camera mount subsystem 800 may pan 360° continuously (unlimited rotations) through the employment of a slip ring 850A. In some implementations, the camera mount subsystem 800 may roll 360° continuously (unlimited rotations) through the employment of a slip ring 850B. In some implementations, as depicted in FIG. 8, Detail A, the camera mount subsystem 800 may tilt 360° continuously (unlimited rotations) through the employment of a slip ring 850C.

The slip rings 850A, 850B and 850C are electromechanical connectors that pass electrical signals (e.g., power) from the stationary members (the boom subsystem, FIG. 6A, item 600 and the suspension coupler, FIG. 7, item 700) to the rotating member (the camera mount subsystem 800). In various examples, the slip rings 850A, 850B and 850C may enable the camera mount subsystem 800 to provide unlimited panning, roll and tilt rotations while receiving electrical signals (e.g., power) from the rest of the PB-CMS. Accordingly, the slip rings 850A, 850B and 850C may advantageously avoid passing wired electrical connections (e.g., cables) across rotating joints, which may otherwise twist and bind around the rotating joints.

The slip rings 850A, 850B and 850C may be implemented on rotating joints together with one or more brushes per slip ring 850A, 850B and 850C. The brushes are the interface between the rotating and stationary portions of the joint. The brushes are held in contact with the slip ring in a tensioned relationship. In some embodiments, the slip rings 850A, 850B and 850C may be employed to pass power. In some examples, the slip rings 850A, 850B and 850C may be employed to pass data signals.

The camera support frame 845 includes an electrical connector 860. In operation, a photographer may mount a camera to the camera support frame 845. Further, the photographer may connect a power harness from the camera to the electrical connector 860, to access camera power. Accordingly, the slip rings 850A, 850B and 850C may advantageously avoid passing wired electrical connections (e.g., cables) across rotating joints, which may otherwise twist and bind around the rotating joints.

In some embodiments, the camera mount subsystem 800 may pass various electrical signals from various interfaces (e.g., D-Tap, P-Tap) which may be from a boom subsystem (e.g., FIG. 6A, item 600) through the HQD plug 805 and through the drives 810, 825 and 840, by employment of the slip rings 850A, 850B and 850C. Further, in an illustrative example, various in-car video monitors may be wirelessly coupled to a camera (mounted within a PB-CMS) by employment of various digital wireless methods (e.g., serial digital interface (SDI) video) to wirelessly transmit video data. Accordingly, employment of the slip rings 850A, 850B and 850C, in combination with the wireless video communication, may advantageously allow the camera mount subsystem 800 to pan, tilt and roll 360° continuously (unlimited rotations) without the cable/wire wrapping restriction.

Figure 9:
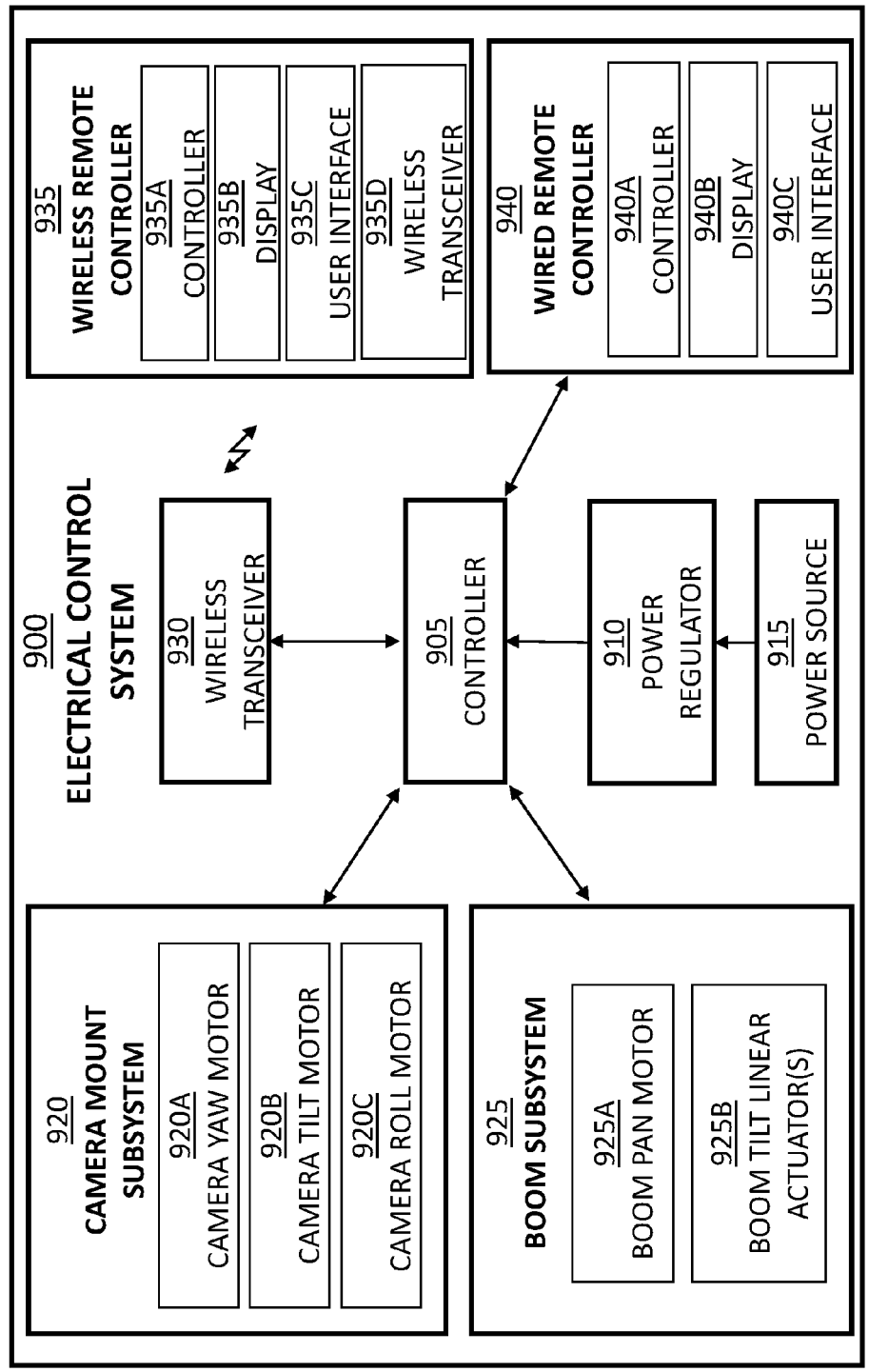
FIG. 9 depicts a schematic view of an electrical control system of an exemplary PB-CMS.

FIG. 9 depicts a schematic view of an electrical control system of an exemplary PB-CMS. A block diagram 900 includes a controller 905. The controller 905 is coupled to a power regulator 910. The power regulator 910 is coupled to a power source 915. In some embodiments, the power source 915 may be a battery, which may advantageously provide mobility to the PB-CMS.

The controller 905 is coupled to a camera mount subsystem 920. The camera mount subsystem 920 includes a camera yaw motor 920A, a camera tilt motor 920B and a camera roll motor 920C. In operation, the controller 905 may control a camera attitude by controlling the motors 920A, 920B, and 920C. In some embodiments, the camera mount subsystem 920 may provide positional feedback to the controller 905.

The controller 905 is coupled to a boom subsystem 925. The boom subsystem 925 includes a boom pan motor 925A and a boom tilt linear actuator 925B. In operation, the controller 905 may control a boom yaw position and a boom vertical position. In some embodiments, the boom subsystem 925 may provide positional feedback to the controller 905.

The controller 905 is coupled to a wireless transceiver 930. The wireless transceiver 930 is wirelessly coupled to a wireless remote controller 935. The wireless remote controller 935 includes a wireless controller 935A, a display 935B, a user interface 935C and a wireless transceiver 935D. The wireless transceiver 935D communicates wirelessly to the wireless transceiver 930.

The controller 905 is coupled to a wired remote controller 940. The wired remote controller 940 includes a wired controller 940A, a display 940B and a user interface 940C.

Although various embodiments have been described with reference to the figures, other embodiments are possible. For example, the PB-CMS may be mounted to various vehicles, for example, cars, trucks, jeeps, boats, airplanes, helicopters, trains, construction equipment, farm implements, military vehicles, trailers and drones. The PB-CMS may also be mounted to various movie-set equipment such as camera dollies, motorized cranes, booms and mobile offices/studios.

In some embodiments, a security strap subsystem may be employed to prevent the feet of a PB-CMS from shifting. The security strap subsystem may provide peace of mind to camera crews, by placing confidence that the expensive camera and ancillary equipment is being held securely in place by more than one method. The security strap subsystem may be intuitive to deploy.

In an illustrative example, one or more boom turnbuckles may be provided for an additional stability connection from a base subsystem to a boom subsystem. The turnbuckles may be a removable bar that attaches to a slot on a base subsystem and a slot on the boom subsystem. Once both slots are engaged the bar may be tensioned and may advantageously provide additional guy-wire type support.

In various embodiments, telescoping legs may transfer force from the weight of the PB-CMS to a roof, hood, or various other structures of a vehicle. Vehicle hoods and roofs tend to be weakest in the center, since those portions are furthest from the frame of the vehicle. Since the contact points are therefore most effective at the corners of the roof and hood, the ankle and foot may adjust the angle of rotation and extension to match that portion of the roof or hood. Accordingly, the foot of various embodiments of the PB-CMS may conform to many different roof shapes and sizes.

In various examples, a PB-CMS may successfully mount to surfaces that are not substantially planar. Further, various hinged telescoping support legs may locate the PB-CMS mounting foot into a suitable mounting area, while the hinged and pilotable couplings on the ends of the support ankle may position of the mounting foot at an appropriate attitude. As such, the PB-CMS may provide a releasably couplable arrangement to various vehicle surfaces (e.g., roof, hood, trunk, door, window, front bumper, back bumper). The wide range of mounting surfaces compatible with the PB-CMS may be due to the flexibility of the mounting foot in conjunction with the support ankle. In some embodiments, the PB-CMS may mount to surfaces other than vehicle surfaces.

In some implementations, the PB-CMS may use the central base as a lone foot. In such implementations, the legs may be left off and the central base may be sized such that stresses to mounting surfaces are lessened.

In some embodiments, a PB-CMS may include a crane remote controller. For example, with reference to paragraphs 7 and 44 of the specification, and page 30-31 of Appendix 1, of U.S. Provisional Application Ser. No. 62/371,573, titled "Vehicular Camera Mount," filed by Zachary C. Nelson, et al., on Aug. 5, 2016, the crane remote controller may include joysticks, switches and control knobs. In operation, the crane remote controller may control the operation of various positioning motors in the PB-CMS. The PB-CMS may interface with various personal electronic devices via various mobile applications (apps). The apps may allow the user to adjust settings (e.g., speed, limits). In some embodiments, the crane remote controller may employ software limits, which may advantageously prevent collisions between the camera and boom with the vehicle. In some implementations, the crane remote controller may allow a speed adjustment and acceleration, which may advantageously allow fine tune crane movement. In some implementations, the PB-CMS may be mounted on a vehicle, and the remote controller may implement a closed-loop control system, which may advantageously provide consistent reactional feel (a user's perception of how the PB-CMS reacts through employment of the remote controller) of the crane's movement, regardless of the vehicle speed or aggression of vehicle driving. In some embodiments, the remote controller may employ haptic feedback.

In some embodiments, a head quick disconnect (HQD), with reference to FIG. 4A and FIG. 4B of U.S. Provisional Application Ser. No. 62/371,573, titled "Vehicular Camera Mount," filed by Zachary C. Nelson, et al., on Aug. 5, 2016, may be employed between a PB-CMS suspension head and a camera mount subsystem. The HQD may allow a user to connect the camera mount subsystem to a suspension head both mechanically and electrically in one step. In an illustrative example, the HQD plug on the camera mount subsystem is inserted into the HQD Socket on the suspension head. In operation, the user first inserts the plug until a spring-loaded pull-pin on the socket engages with an audible click. This may act as a safety release, ensuring the head cannot accidentally release from the boom accidentally. Once clicked into place, the user may tighten a knob which closes a shaft collar around the plug. This click and clamp may represent a single step for the user. The plug may be secured by the friction and clamping force of the shaft collar. Further the plug may be disengaged by loosening the shaft collar and pulling the spring-loaded pull-pin.

A PB-CMS may be employed with various stabilizing mechanisms within the boom. For example, with reference to paragraph 27 of the specification, item 130 of FIG. 1, page 4 and 19 of appendix 1, and page 4 of appendix 2, of U.S. Provisional Application Ser. No. 62/371,573, titled "Vehicular Camera Mount," filed by Zachary C. Nelson, et al., on Aug. 5, 2016, an exemplary image stabilizer of a boom subsystem may be implemented as a sub-section of the boom arm. The image stabilizer may dampen unwanted vibrations between a driving surface (not absorbed by the vehicle's suspension) and a pan/tilt head which may include a camera and optics.

In an exemplary embodiment, a digital lens motor drive may be implemented on a camera mount subsystem. For example, with reference to paragraph 52 of the specification, and page 16 of Appendix 1, of U.S. Provisional Application Ser. No. 62/371,573, titled "Vehicular Camera Mount," filed by Zachary C. Nelson, et al., on Aug. 5, 2016, various lens control motors may provide control over the rotary functions housed within a manual camera lens (Aperture, Focal Length, Focus Distance). In some embodiments, the lens control motor may be substantially water-resistant.

In some examples, a PB-CMS may be weather resistant. In some examples, a PB-CMS may include lightweight materials (e.g., carbon fiber). In various examples, user setup of the PB-CMS may be uncomplicated and intuitive.

In some examples, a security harness may be employed on a PB-CMS. In some embodiments, a security harness may be placed over each telescoping support leg such that peeling forces due to rapid acceleration breaking cornering and drag, may be minimized.

In some embodiments, the camera mount subsystem may include internally-housed pan/tilt and lens control motors. In some embodiments, the control motors may support weather resistance. In some implementations, the camera mount subsystem may implement built-in signal connectors, which may advantageously avoid rogue wires and cables, and provide aesthetic continuity. In some implementations, the camera mount subsystem may employ 360° panning rotation (unlimited rotations), and may employ fully-pointed-up to fully-pointed-down tilting rotation, which may advantageously provide full freedom of camera shots. In some examples, the pan/tilt head may allow the operator to aim the camera at a subject independent of the position of the boom.

In various embodiments, a PB-CMS may be powered externally (e.g., vehicle battery). Users may couple the PB-CMS input power to vehicle power by various methods, for example, by connection to the vehicle's cigarette lighter, via a cable harness to the vehicle battery or to other vehicle power distribution point. In some examples, installers may install a supplemental battery system to better suit the power needs for their application.

In various embodiments, a PB-CMS may be powered by one or more capacitors (e.g., ultracapacitors) connected in series and/or parallel to create a power supply. The capacitors may be trickle-charged via the vehicle cigarette lighter. Further, the cranking current to support peak use of a boom panning/yaw motor may be provided by an ultracapacitor bank. After the peak use period has ended, the ultracapacitor bank may be recharged via the trickle charging. In an illustrative example, use of the ultracapacitors may be a factor in advantageously reducing the weight of the PB-CMS system. Further, the low effective series resistance of the ultracapacitor bank may advantageously provide very high currents, which may advantageously avoid employment of heavy batteries within the PB-CMS.

In some embodiments, the PB-CMS may be powered by one or more ultracapacitors, in place of, or in addition to, one or more batteries. Ultracapacitors may exhibit a linear voltage discharge profile. Further, if the power supply is above a predetermined voltage threshold, the PWM signal applied to the motors may receive a duty cycle decrease to achieve compensation. Conversely, if the voltage supply is below a predetermined voltage threshold, the PWM signal applied to the motors may receive a duty cycle increase to achieve compensation.

In some embodiments, the operator may control the PB-CMS in a peak-use application for as long as the ultracapacitors can provide power, and during the complete peak use period. The autonomous voltage detection on compensation allows the PB-CMS to operate smoothly and intuitively in all conditions. Accordingly, the operator may advantageously experience a consistent feel and/or control of the PB-CMS.

In various examples, the PB-CMS may employ a fully wireless remote-control device. In some examples, the PB-CMS may employ a wired remote-control device.

In some embodiments, the vehicular camera mount may include surface fasteners that may function individually to permit mounting the vehicular camera mount to a variety of surfaces, such as, for example, different rooftops of different vehicles. In an illustrative example, the vehicular camera mount may include one or more modular assemblies to facilitate both assembly and disassembly of the vehicular camera mount. For example, the modular assemblies forming the vehicular camera mount may be swappable to advantageously permit a photographer to efficiently replace an assembly in the event of an assembly malfunction. The modular assemblies may permit a photographer to assemble the vehicular camera mount using different assemblies based on the photographer's preferences. For example, an assembly may be a type of camera head, such as a gimbal head or a pan/tilt head, that a photographer prefers for capturing video or images.

In some embodiments, the vehicular camera mount may be constructed as a single unit having integrally formed electronic elements and mechanical elements. The unitary construction may reduce the number of steps necessary for a user(s) to mount or dismount the vehicular camera mount from a roof of a vehicle, for example. The vehicular camera mount may include external wiring to allow a user easier access to the wiring.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A vehicular mounting apparatus comprising:
   a central support hub comprising:
      a central base; and,
      a turntable supported by the central base and configured for unlimited rotation with respect to the central frame, the turntable comprising:
         a first tower socket adapted to releasably couple to a central boom, wherein the first tower socket comprises a drive member adapted to impart rotation to the central boom; and,
         a second tower socket adapted to releasably couple to the central boom, wherein the second tower socket comprises an electrical coupler adapted to provide electrical power and signals to the central boom;
   a plurality of support members configured to couple at a proximal end to the central base, and configured to radially extend from the central base in a common plane, each of the support members comprising:
      a support leg configured to pivotably couple at a proximal end to the central base;
      a support ankle configured to pivotably couple at a proximal end to a distal end of the support leg; and,
      a foot configured to pivotably couple at a proximal end to a distal end of the support ankle, the foot adapted to releasably couple to a surface.

2. The vehicular mounting apparatus of claim 1, wherein the support leg is configured to selectively articulate away from and towards the central base in a telescoping fashion.

3. The vehicular mounting apparatus of claim 1, wherein the central base further comprises a plurality of hip clamps, which are configured to couple a respective one of the plurality of support members to the central base.

4. The vehicular mounting apparatus of claim 1, wherein the support ankle comprises a toolless locking member configured to selectively lock the support leg and foot in a fixed position relative to the support ankle.

5. The vehicular mounting apparatus of claim 4, wherein the toolless locking member comprises:
a hand knob fixed to a threaded rod;
a threaded ram configured to threadedbly receive the threaded rod;
a first pin configured to selectively lock the support leg in a fixed position relative to the support ankle; and,
a second pin configured to selectively lock the foot in a fixed position relative to the support ankle.

6. The vehicular mounting apparatus of claim 5, wherein the movement of the threaded rod into the support ankle results in downward movement of the threaded ram, which forces the first and second pins away from each other toward a locking position.

7. The vehicular mounting apparatus of claim 6, wherein the threaded ram is substantially wedge-shaped.

8. The vehicular mounting apparatus of claim 1, further comprising a plurality of hook-and-strap attachment members adapted to releasably couple the support member to a surface.

9. The vehicular mounting apparatus of claim 1, wherein the foot comprises a suction cup adapted to releasably couple the foot to the surface.

10. A vehicular mounting apparatus comprising:
a central support hub comprising:
    a central base; and,
    a turntable supported by the central base and configured for unlimited rotation with respect to the central frame, wherein the turntable comprises:
        a first tower socket adapted to releasably couple to a central boom, wherein the first tower socket comprises a drive member adapted to impart rotation to the central boom; and,
        a second tower socket adapted to releasably couple to the central boom, wherein the second tower socket comprises an electrical coupler adapted to provide electrical power and signals to the central boom;
a plurality of support members configured to couple at a proximal end to the central base, and configured to radially extend from the central base in a common plane, each of the support members comprising:
    a support leg configured to pivotably couple at a proximal end to the central base;
    a support ankle configured to pivotably couple at a proximal end to a distal end of the support leg; and,
    a foot configured to pivotably couple at a proximal end to a distal end of the support ankle, the foot adapted to releasably couple to a surface,
wherein the support ankle comprises:
    means for selectively locking the support leg and foot in a fixed position relative to the support ankle.

11. The vehicular mounting apparatus of claim 10, wherein the foot comprises a suction cup adapted to releasably couple the foot to the surface.

\* \* \* \* \*